United States Patent
Zhu et al.

(10) Patent No.: US 11,930,393 B2
(45) Date of Patent: Mar. 12, 2024

(54) SESSION MANAGEMENT METHOD AND APPARATUS

(71) Applicant: HUAWEI TECHNOLOGIES CO.,LTD., Guangdong (CN)

(72) Inventors: Hualin Zhu, Shanghai (CN); Huan Li, Shanghai (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 223 days.

(21) Appl. No.: 17/377,192

(22) Filed: Jul. 15, 2021

(65) Prior Publication Data

US 2021/0345161 A1 Nov. 4, 2021

Related U.S. Application Data

(63) Continuation of application No. PCT/CN2020/072279, filed on Jan. 15, 2020.

(30) Foreign Application Priority Data

Jan. 15, 2019 (CN) .......................... 201910037199.8

(51) Int. Cl.
*H04W 28/02* (2009.01)
*H04W 28/12* (2009.01)
(Continued)

(52) U.S. Cl.
CPC ....... *H04W 28/0268* (2013.01); *H04W 28/12* (2013.01); *H04W 28/24* (2013.01); *H04W 76/15* (2018.02); *H04W 88/06* (2013.01)

(58) Field of Classification Search
CPC . H04W 28/0268; H04W 28/12; H04W 28/24; H04W 76/11; H04W 76/12;
(Continued)

(56) References Cited

U.S. PATENT DOCUMENTS 11,323,933 B2 * 5/2022 Chong ................... H04W 76/12
11,665,575 B2 * 5/2023 Liu ....................... H04W 76/12
  370/229
(Continued)

FOREIGN PATENT DOCUMENTS

CN        105634979 A        6/2016
CN        107484224 A        12/2017
(Continued)

OTHER PUBLICATIONS

3GPP TR 23.716 V2.0.0 (Dec. 2018), 3rd Generation Partnership Project; Technical Specification Group Services and System Aspects; Study on the Wireless and Wireline Convergence for the 5G system architecture(Release 16), 184 pages.
(Continued)

*Primary Examiner* — Robert J Lopata
(74) *Attorney, Agent, or Firm* — Paul Hashim

(57) ABSTRACT

Embodiments of this application provide a session management method to provide quality of service (QoS) assurance for a service of a terminal. The method includes: determining, by a first control plane network element in a second network, to manage a session, where the session is used to provide a connection in the first network for a terminal, and the first control plane network element is a network element in the first network; and managing, by the first control plane network element, the session.

16 Claims, 25 Drawing Sheets

(51) Int. Cl.
*H04W 28/24* (2009.01)
*H04W 76/15* (2018.01)
*H04W 88/06* (2009.01)

(58) Field of Classification Search
CPC ..... H04W 76/15; H04W 76/22; H04W 88/06; H04W 92/02
USPC .......................................................... 370/329
See application file for complete search history.

(56) References Cited

U.S. PATENT DOCUMENTS

| | | | |
|---|---|---|---|
| 2019/0274178 A1* | 9/2019 | Salkintzis | H04W 40/12 |
| 2019/0313310 A1* | 10/2019 | Won | H04W 28/16 |
| 2020/0196375 A1* | 6/2020 | Ryu | H04W 76/34 |
| 2021/0282049 A1* | 9/2021 | Sun | H04W 28/24 |
| 2021/0297457 A1* | 9/2021 | Schneider | H04W 12/02 |
| 2021/0306275 A1* | 9/2021 | Ke | H04L 47/24 |
| 2021/0306849 A1* | 9/2021 | Liu | H04W 12/037 |
| 2021/0360742 A1* | 11/2021 | Liao | H04W 88/08 |
| 2022/0022088 A1* | 1/2022 | Gebert | H04W 28/0268 |
| 2022/0046755 A1* | 2/2022 | Yang | H04W 80/10 |

FOREIGN PATENT DOCUMENTS

| | | |
|---|---|---|
| CN | 108541031 A | 9/2018 |
| CN | 109120528 A | 1/2019 |
| EP | 3512223 A1 | 7/2019 |
| EP | 3893575 A1 | 10/2021 |
| EP | 3962781 A1 | 3/2022 |
| RU | 2656696 C1 | 6/2018 |
| WO | 2017196106 A1 | 11/2017 |
| WO | 2017211320 A1 | 12/2017 |
| WO | 2018059514 A1 | 4/2018 |
| WO | 2018068216 A1 | 4/2018 |
| WO | 2018166335 A1 | 9/2018 |
| WO | 2018167254 A1 | 9/2018 |
| WO | 2020244873 A1 | 12/2020 |

OTHER PUBLICATIONS

3GPP TS 23.501 V15.4.0 (Dec. 2018), 3rd Generation Partnership Project; Technical Specification Group Services and System Aspects; System Architecture for the 5G System; Stage 2(Release 15), 236 pages.
3GPP TS 23.246 V15.0.0 (Dec. 2017-12), 3rd Generation Partnership Project; Technical Specification Group Services and System Aspects; Multimedia Broadcast/Multicast Service (MBMS); Architecture and functional description(Release 15), 77 pages.
Huawei, HiSilicon, Hybrid Access definition and solution. SA WG2 Meeting #128bis, Aug. 20-24, 2018, Sophia Antipolis, France, S2-188281, 7 pages.
3GPP TS 29.244 V15.4.0 (Dec. 2018), 3rd Generation Partnership Project; Technical Specification Group Core Network and Terminals; Interface between the Control Plane and the User Plane Nodes; Stage 3(Release 15), 194 pages.
3GPP TS 23.502 V15.4.1 (Jan. 2019), 3rd Generation Partnership Project; Technical Specification Group Services and System Aspects; Procedures for the 5G System; Stage 2(Release 15), 347 pages.
3GPP TS 22.261 V16.6.0 (Dec. 2018), 3rd Generation Partnership Project; Technical Specification Group Services and System Aspects; Service requirements for the 5G system; Stage 1(Release 16), 72 pages.
S.Homma:"User Plane Protocol and Architectural Analysis on 3GPP 5G System", DMM Working Group,Jan. 6, 2019, total 32 pages.
Huawei, HiSilicon, Discussion on Reflective QoS activation using C-plane and U-plane, S2-170065, 2017, 3 pages.

* cited by examiner

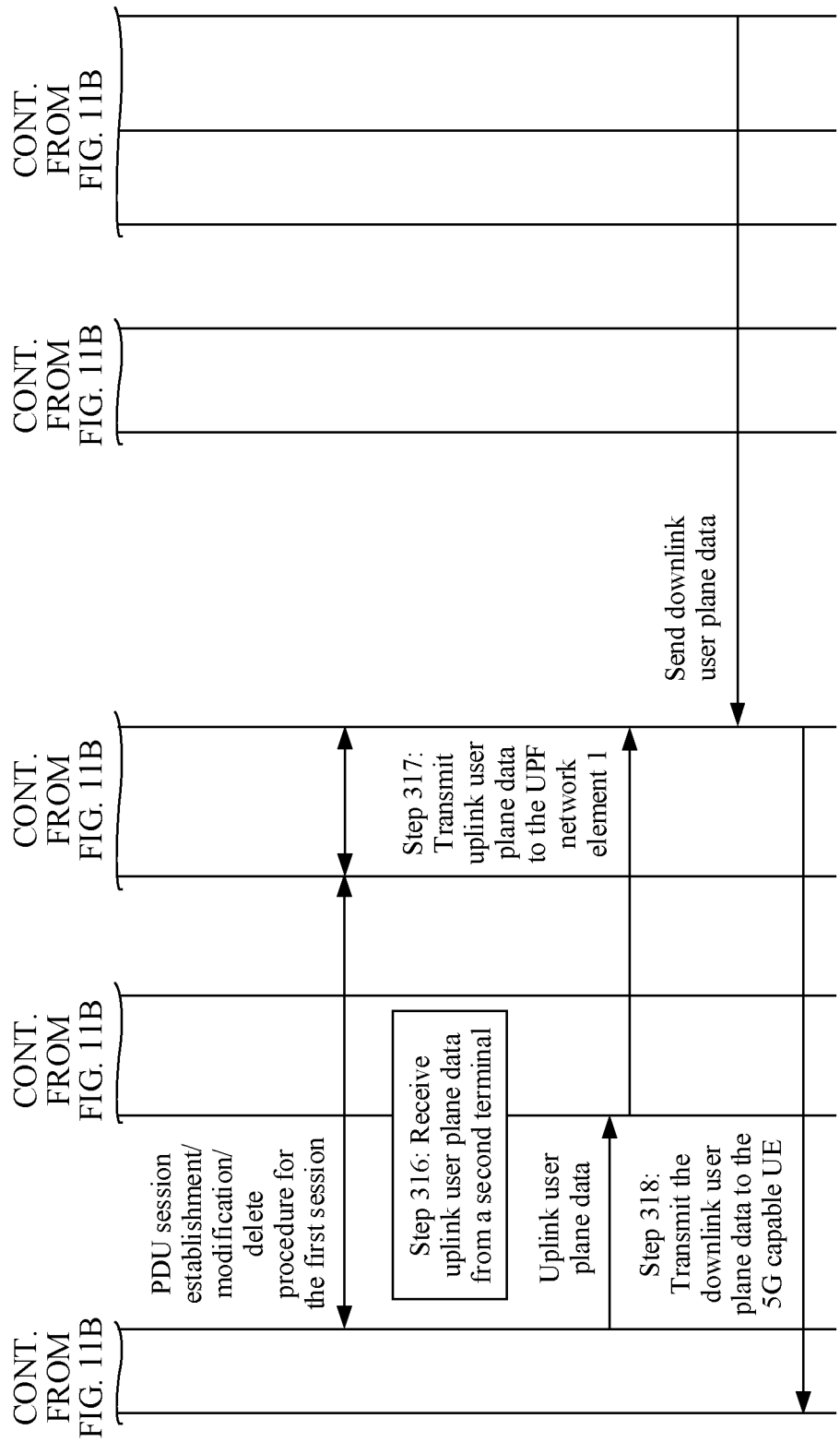

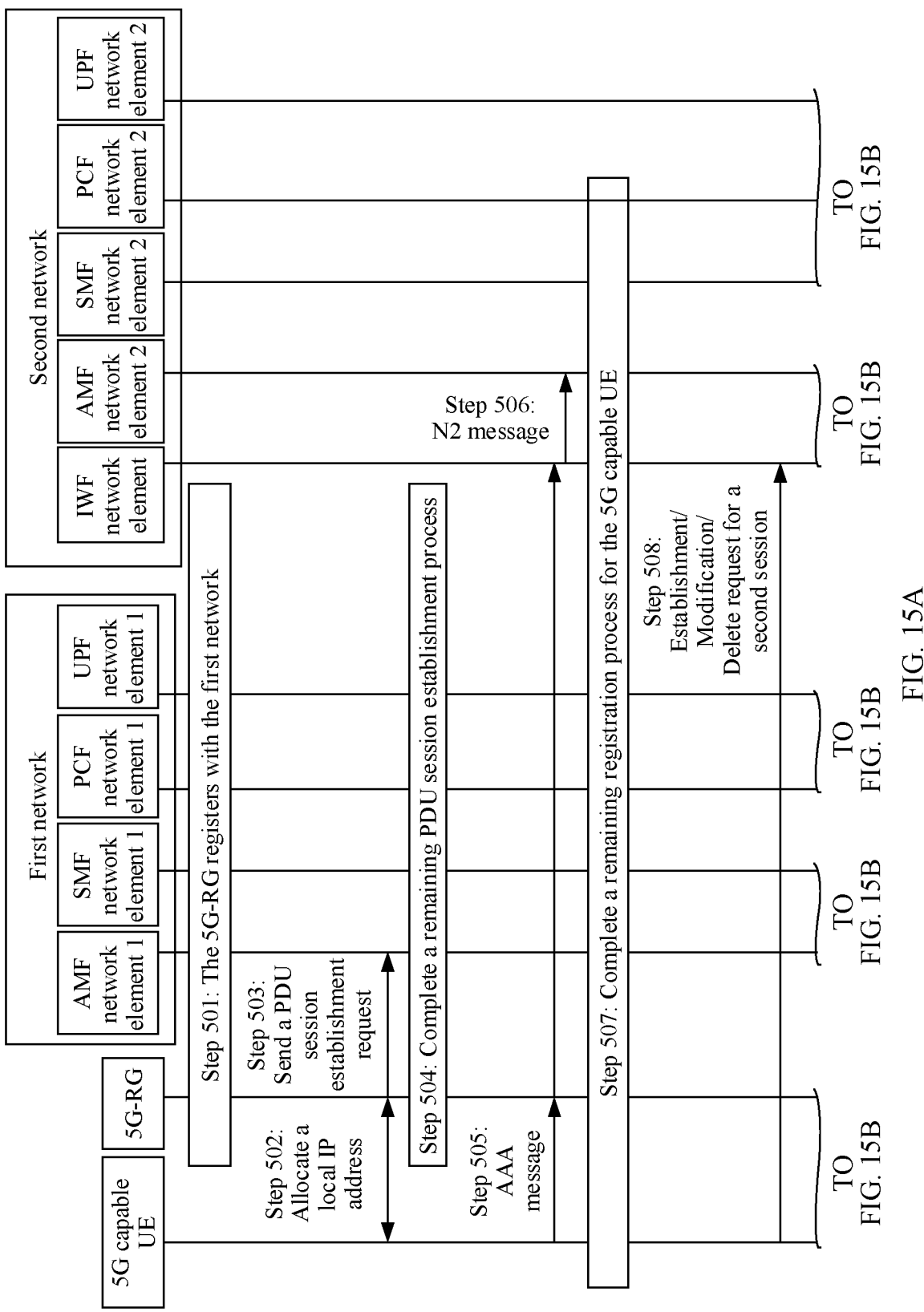

SESSION MANAGEMENT METHOD AND APPARATUS

CROSS-REFERENCE TO RELATED APPLICATION

This application is a continuation of International Application No. PCT/CN2020/072279, filed on Jan. 15, 2020, which claims priority to Chinese Patent Application No. 201910037199.8, filed on Jan. 15, 2019. The disclosure of the aforementioned applications are hereby incorporated by reference in their entireties.

TECHNICAL FIELD

Embodiments of this application relate to the field of communications technologies, and in particular, to a session management method and apparatus.

BACKGROUND

To address a challenge of a wireless broadband technology a 3rd generation partnership project (3GPP) network formulated a next generation mobile communications network architecture (Next Generation System), which may also be referred to as a fifth-generation (5G) network architecture. The 5G network architecture supports a terminal in accessing a 5G core network (CN) side by using a wireless technology (for example, long term evolution (LTE) or a 5G radio access network (RAN)) defined by the 3GPP standard group, and supports access to the core network side by using a non-3GPP interworking function (N3IWF) or a next generation access gateway (ngPDG) in a non-3GPP access technology.

In addition to supporting access that is performed by using the RAN, a 5G Core (5GC) may further support access that is performed by using a fixed network/wireline network (where for example, the 5GC supports access of a residential gateway (RG) that is performed by using the wireline network). In this scenario, a terminal that supports the 5GC (a 5GC terminal for short below) may access the 5GC by using the residential gateway.

A first network includes 5GC network elements that serve the RG. A second network includes 5GC network elements that serve the 5GC terminal. The 5GC terminal may be connected to the second network by using the first network. However, the first network does not know quality of service (QoS) that should be used to transmit data of the 5GC terminal. Therefore, service QoS of the 5GC terminal cannot be ensured.

SUMMARY

Embodiments of this application provide a session management method and apparatus, to provide QoS assurance for a service of a terminal.

The following technical solutions are provided in the embodiments of this application.

According to a first aspect, an embodiment of this application provides a session management method. The solution includes determining, by a first control plane network element in a first network, to manage a first session, where the first session is used to provide a connection in the first network for a second terminal, and the first control plane network element is a network element in the first network; and managing, by the first control plane network element, the first session.

The second terminal accesses a second network by using the first network. The second network is configured to serve the second terminal.

This embodiment of this application provides the session management method. The first control plane network element is for determining that the first session needs to be managed, and then perform a process of managing the first session. In this way, for a network architecture in which the second terminal accesses the second network by using the first network, a quality-of-service (QoS) parameter that is for transmitting user plane data of the second terminal and that is in the first network can be changed through the management of the first session in the first network. Compared with the prior art in which fixed and unified QoS is used to transmit the user plane data of the second terminal, accurate QoS assurance can be provided for the user plane data of the second terminal.

In one optional implementation, the determining, by a first control plane network element in a first network, to manage a first session specifically includes: determining, by the first control plane network element, that a second QoS parameter that is of user plane data of the second terminal and that is in a second network is inconsistent with a first QoS parameter of user plane data in the first network, where the second network is a network accessed by the second terminal by using the first network. In a process in which user plane data of the second terminal is transmitted to the second network by using the first network, the first control plane network element may autonomously determine, based on a relationship between the second QoS parameter of the user plane data in the second network and the first QoS parameter of the user plane data in the first network, whether the first session needs to be managed.

In another possible implementation, the determining, by the first control plane network element, that a second QoS parameter that is of user plane data of the second terminal and that is in a second network is inconsistent with a first QoS parameter of user plane data in the first network means: determining, by the first control plane network element, that a second QoS parameter that is of user plane data of the second terminal in the second network and that is in the second network is inconsistent with a first QoS parameter that is of user plane data of the second terminal in the first network and that is in the first network.

In an optional implementation, the managing, by the first control plane network element, the first session includes: managing, by the first control plane network element, the first session based on the second QoS parameter. In this way, the QoS parameter that is for transmitting the user plane data of the second terminal and that is in the first network can be consistent with the QoS parameter that is for transmitting the user plane data of the second terminal and that is in the second network.

In an optional implementation, the method provided in this embodiment of this application further includes: receiving, by the first control plane network element, a session management trigger message that is from a second control plane network element and that requests the first control plane network element to manage the first session. The determining, by a first control plane network element in a first network, to manage a first session includes: determining, by the first control plane network element based on the session management trigger message, to manage the first session in the first network. In this way, the first control plane network element can determine, based on triggering of the second control plane network element, to manage the first session in the first network.

In an optional implementation, the session management trigger message includes QoS parameter information used to determine a QoS requirement for transmitting user plane data of the second terminal. The managing, by the first control plane network element, the first session includes: managing, by the first control plane network element, the first session based on the QoS parameter information. In this way, the first control plane network element may transmit the user plane data of the second terminal in the first network according to the QoS requirement that is indicated by the second control plane network element and that is for transmitting the user plane data of the second terminal in the first network. It may be understood that the QoS parameter information used to determine the QoS requirement for transmitting the user plane data of the second terminal may alternatively be QoS parameter information used to determine a QoS requirement for transmitting user plane data of the second terminal in the first network.

In an optional implementation, the method provided in this embodiment of this application further includes: receiving, by the first control plane network element, information about the second terminal or information about a first terminal that is from the second control plane network element, where the information about the second terminal is for determining the first session, and the information about the first terminal is for determining the first session. The determining, by a first control plane network element in a first network, to manage a first session includes: determining, by the first control plane network element based on the information about the second terminal and/or the information about the first terminal, to manage the first session. In this way, the first control plane network element determines, based on the information about the second terminal or the information about the first terminal, to initiate a session management procedure to the first session.

In an optional implementation, the information about the second terminal includes any one or more of the following information: an identifier of the second terminal, an identifier of the first session, an IP address of the second terminal, and an identifier of a second session, where the second session is used to provide a connection in the second network for the second terminal.

In an optional implementation, the information about the first terminal includes any one or more of the following information: an identifier of the first terminal, the identifier of the first session, an IP address of the first terminal, and the identifier of the second session, where the second session is used to provide the connection in the second network for the second terminal.

In an optional implementation, the QoS parameter information includes any one or more of the following information: a service descriptor and a QoS indication. The service descriptor is for determining the user plane data, and the QoS indication indicates a QoS resource used by the user plane data that corresponds to the service descriptor. The user plane data that the service descriptor is for determining is the user plane data of the second terminal in the first network. Correspondingly, that the QoS indication indicates the QoS resource used by the user plane data that corresponds to the service descriptor is equivalent to that the QoS indication indicates a requirement on a QoS resource used by the user plane data that is of the second terminal in the first network and that corresponds to the service descriptor. Descriptions are uniformly provided herein, and details are not described subsequently again.

In an optional implementation, the method provided in this embodiment of this application further includes: sending, by the first control plane network element, the QoS parameter information to a first user plane network element in the first network and/or the first terminal in the first network, and accessing, by the second terminal, the second network by using the first terminal. In this way, the first terminal and/or the second terminal can determine a QoS requirement for transmitting the user plane data, thereby transmitting the user plane data based on the determined QoS requirement.

In an optional implementation, the method provided in this embodiment of this application further includes: determining, by the first control plane network element, target QoS parameter information for transmitting the user plane data in the first network; and sending, by the first control plane network element, the target QoS parameter information to a first user plane network element in the first network and/or a first terminal in the first network. It may be understood that the determining, by the first control plane network element, target QoS parameter information for transmitting the user plane data in the first network is equivalent to determining, by the first control plane network element, target QoS parameter information of the user plane data of the second terminal in the first network.

In an optional implementation, the managing, by the first control plane network element, the first session includes: modifying, by the first control plane network element, the first session, deleting, by the first control plane network element, the first session, or establishing, by the first control plane network element, the first session. In this way, the first session may be updated in a plurality of manners, so that user plane data transmitted in the first session meets the QoS requirement.

In an optional implementation, the method provided in this embodiment of this application further includes: controlling, by the first control plane network element after determining target QoS parameter information of the first session in the first network, the first terminal to transmit user plane data of the second terminal to the second network by using a data transmission channel between the first network and the second network.

According to a second aspect, an embodiment of this application provides a session management method, including: determining, by a first terminal, a first session managed in a first network; and managing, by the first terminal, the first session.

In an optional implementation, the method provided in this embodiment of this application further includes: receiving, by the first terminal, information about a second terminal and/or information about the first terminal that are/is from the second terminal, where the information about the second terminal is for determining the first session, and the information about the first terminal is for determining the first session; the determining, by a first terminal, a first session managed in a first network includes: determining, by the first terminal based on the information about the second terminal and/or the information about the first terminal, to manage the first session.

In an optional implementation, the method provided in this embodiment of this application further includes: receiving, by the first terminal, QoS parameter information from the second terminal, where the QoS parameter information is for determining a QoS requirement for transmitting user plane data of the second terminal; the managing, by the first terminal, the first session includes: managing, by the first terminal, the first session based on the QoS parameter information. It may be understood that, that the QoS parameter information is for determining a QoS requirement for transmitting user plane data of the second terminal herein is equivalent to that the QoS parameter information is for determining a QoS requirement for transmitting user plane data of the second terminal in the first network.

In an optional implementation, the method provided in this embodiment of this application further includes: sending, by the first terminal, the QoS parameter information to a first user plane network element in the first network in a process in which the first terminal manages the first session, where the QoS parameter information indicates to transmit the user plane data of the second terminal in the first network based on the QoS parameter information.

In an optional implementation, the QoS parameter information includes any one or more of the following information: a service descriptor and a QoS indication, where the service descriptor is for determining the user plane data of the second terminal in the first network, and the QoS indication indicates a requirement on a QoS resource used by the user plane data that is of the second terminal in the first network and that corresponds to the service descriptor.

In an optional implementation, the method provided in this embodiment of this application further includes: transmitting, by the first terminal, user plane data to a second network by using a data transmission channel in the first network.

According to a third aspect, an embodiment of this application provides a session management method, including: managing, by a second control plane network element in a second network, a second session in the second network, where the second session is used to provide a connection in the second network for a second terminal; and sending, by the second control plane network element, a session management trigger message to a first control plane network element in a first network, and accessing, by the second terminal, the second network by using the first network, where the session management trigger message requests to manage a first session in the first network, and the first session is used to provide a connection in the first network for the second terminal.

In an optional implementation, the session management trigger message includes QoS parameter information, and the QoS parameter information is for determining a QoS requirement for transmitting first user plane data of the second terminal in the first network.

In an optional implementation, the method provided in this embodiment of this application further includes: sending, by the second control plane network element, information about the second terminal and/or information about a first terminal to the first control plane network element, where the information about the second terminal is for determining the first session in the first network, and the information about the first terminal is for determining the first session in the first network.

In an optional implementation, the method provided in this embodiment of this application further includes: obtaining, by the second control plane network element, information about the first control plane network element, where the information about the first control plane network element is for determining the first control plane network element.

In an optional implementation, the obtaining, by the second control plane network element, information about the first control plane network element includes: obtaining, by the second control plane network element, the information about the first terminal in a process in which the second terminal registers with the second network or in a process in which the second terminal manages the second session by using the second network, where the first terminal is configured to provide a connection for the second terminal; and determining, by the second control plane network element, the first control plane network element based on the information about the first terminal.

According to a fourth aspect, an embodiment of this application provides a session management method, including: obtaining, by a second user plane network element in a second network, at least one of a flow descriptor and a service descriptor in a management process of a second session, where the second session is used to provide a connection in the second network for a second terminal; and accessing, by the second terminal, the second network by using a first network; and adding, by the second user plane network element, a corresponding service descriptor to user plane data identified by the flow descriptor.

According to a fifth aspect, an embodiment of this application provides a session management method, including: receiving, by a first user plane network element in a first network, QoS parameter information from a first control plane network element in the first network, where the QoS parameter information is for determining a QoS requirement for transmitting user plane data of a second terminal in the first network; and transmitting, by the first user plane network element, user plane data of the second terminal to a second network by using a data transmission channel between the first network and the second network based on the QoS parameter information, where the second network is a network accessed by the second terminal by using the first network.

In an optional implementation, the QoS parameter information includes a service descriptor and a quality-of-service QoS indication. The service descriptor is for determining the user plane data of the second terminal in the first network, and the QoS indication indicates a requirement on a QoS resource used by the user plane data that is of the second terminal in the first network and that corresponds to the service descriptor.

In any one of the first aspect and the fifth aspect or any one of the implementations of the first aspect and the fifth aspect, the first network may include network elements on a network with which the first terminal registers, and the second network may include network elements on a network with which the second terminal registers.

In any one of the first aspect to the fifth aspect or any one of the implementations of the first aspect to the fifth aspect, the first terminal may be a terminal registering with the first network, and the second terminal may be a terminal registering with the second network. The second terminal may transmit the user plane data to the second network through the first terminal and the data transmission channel between the first network and the second network.

In any one of the first aspect and the second aspect or any one of the implementations of the first aspect and the second aspect, the managing, by the first control plane network element, the first session includes: modifying, by the first control plane network element, the first session, or initiating, by the first control plane network element, a first session modification procedure.

According to a sixth aspect, an embodiment of this application provides a session management apparatus. The session management apparatus may be a first control plane network element, or may be a chip inside a first control plane network element. The session management apparatus may include a processing unit and a communications unit. When the session management apparatus is a first control plane network element, the processing unit may be a processor, and the communications unit may be a communications interface or an interface circuit. The session management apparatus may further include a storage unit. The storage unit may be a memory. The storage unit is configured to store an instruction, and the processing unit executes the instruction stored in the storage unit, so that the first control plane network element implements the session management method according to any one of the first aspect or the possible implementations of the first aspect. When the session management apparatus is a chip inside a first control plane network element, the processing unit may be a processor, and the communications unit may be a communications interface, for example, an input/output interface, a pin, or a circuit. The processing unit executes an instruction stored in a storage unit, so that the first control plane network element implements the session management method according to any one of the first aspect or the possible implementations of the first aspect. The storage unit may be a storage unit (for example, a register or a cache) inside the chip, or may be a storage unit (for example, a read-only memory or a random access memory) that is inside the first control plane network element and that is located outside the chip.

According to a seventh aspect, an embodiment of this application provides a session management apparatus. The session management apparatus may be a first terminal, or may be a chip inside a first terminal. The session management apparatus may include a processing unit and a communications unit. When the session management apparatus is a first terminal, the processing unit may be a processor, and the communications unit may be a transceiver. The session management apparatus may further include a storage unit. The storage unit may be a memory. The storage unit is configured to store an instruction, and the processing unit executes the instruction stored in the storage unit, so that the first terminal implements the session management method according to any one of the second aspect or the possible implementations of the second aspect. When the session management apparatus is a chip inside a first terminal, the processing unit may be a processor, and the communications unit may be a communications interface, for example, an input/output interface, a pin, or a circuit. The processing unit executes an instruction stored in a storage unit, so that the first terminal implements the session management method according to any one of the second aspect or the possible implementations of the second aspect. The storage unit may be a storage unit (for example, a register or a cache) inside the chip, or may be a storage unit (for example, a read-only memory or a random access memory) that is inside the first terminal and that is located outside the chip.

According to an eighth aspect, an embodiment of this application provides a session management apparatus. The session management apparatus may be a second control plane network element, or may be a chip inside a second control plane network element. The session management apparatus may include a processing unit and a communications unit. When the session management apparatus is a second control plane network element, the processing unit may be a processor, and the communications unit may be a communications interface or an interface circuit. The session management apparatus may further include a storage unit. The storage unit may be a memory. The storage unit is configured to store an instruction, and the processing unit executes the instruction stored in the storage unit, so that the second control plane network element implements the session management method according to any one of the third aspect or the possible implementations of the third aspect. When the session management apparatus is a chip inside a second control plane network element, the processing unit may be a processor, and the communications unit may be a communications interface, for example, an input/output interface, a pin, or a circuit. The processing unit executes an instruction stored in a storage unit, so that the second control plane network element implements the session management method according to any one of the third aspect or the possible implementations of the third aspect. The storage unit may be a storage unit (for example, a register or a cache) inside the chip, or may be a storage unit (for example, a read-only memory or a random access memory) that is inside the second control plane network element and that is located outside the chip.

According to a ninth aspect, an embodiment of this application provides a session management apparatus. The session management apparatus may be a second user plane network element, or may be a chip inside a second user plane network element. The session management apparatus may include a processing unit and a communications unit. When the session management apparatus is a second user plane network element, the processing unit may be a processor, and the communications unit may be a communications interface or an interface circuit. The session management apparatus may further include a storage unit. The storage unit may be a memory. The storage unit is configured to store an instruction, and the processing unit executes the instruction stored in the storage unit, so that the second user plane network element implements the session management method according to any one of the fourth aspect or the possible implementations of the fourth aspect. When the session management apparatus is a chip inside a second user plane network element, the processing unit may be a processor, and the communications unit may be a communications interface, for example, an input/output interface, a pin, or a circuit. The processing unit executes an instruction stored in a storage unit, so that the second user plane network element implements the session management method according to any one of the fourth aspect or the possible implementations of the fourth aspect. The storage unit may be a storage unit (for example, a register or a cache) inside the chip, or may be a storage unit (for example, a read-only memory or a random access memory) that is inside the second user plane network element and that is located outside the chip.

According to a tenth aspect, an embodiment of this application provides a session management apparatus. The session management apparatus may be a first user plane network element, or may be a chip inside a first user plane network element. The session management apparatus may include a processing unit and a communications unit. When the session management apparatus is a first user plane network element, the processing unit may be a processor, and the communications unit may be a communications interface or an interface circuit. The session management apparatus may further include a storage unit. The storage unit may be a memory. The storage unit is configured to store an instruction, and the processing unit executes the instruction stored in the storage unit, so that the first user plane network element implements the session management method according to any one of the fifth aspect or the possible implementations of the fifth aspect. When the session management apparatus is a chip inside a first user plane network element, the processing unit may be a processor, and the communications unit may be a communications interface, for example, an input/output interface, a pin, or a circuit. The processing unit executes an instruction stored in a storage unit, so that the first user plane network element implements the session management method according to any one of the fifth aspect or the possible implementations of the fifth aspect. The storage unit may be a storage unit (for example, a register or a cache) inside the chip, or may be a storage unit (for example, a read-only memory or a random access memory) that is inside the first user plane network element and that is located outside the chip.

According to an eleventh aspect, an embodiment of this application provides a computer-readable storage medium. The computer-readable storage medium stores a computer program or an instruction. When the computer program or the instruction is run on a computer, the computer is enabled to perform the session management method according to any one of the first aspect or the possible implementations of the first aspect.

According to a twelfth aspect, an embodiment of this application provides a computer-readable storage medium. The computer-readable storage medium stores a computer program or an instruction. When the computer program or the instruction is run on a computer, the computer is enabled to perform the session management method according to any one of the second aspect or the possible implementations of the second aspect.

According to a thirteenth aspect, an embodiment of this application provides a computer-readable storage medium. The computer-readable storage medium stores a computer program or an instruction. When the computer program or the instruction is run on a computer, the computer is enabled to perform the session management method according to any one of the third aspect or the possible implementations of the third aspect.

According to a fourteenth aspect, an embodiment of this application provides a computer-readable storage medium. The computer-readable storage medium stores a computer program or an instruction. When the computer program or the instruction is run on a computer, the computer is enabled to perform the session management method according to any one of the fourth aspect or the possible implementations of the fourth aspect.

According to a fifteenth aspect, an embodiment of this application provides a computer-readable storage medium. The computer-readable storage medium stores a computer program or an instruction. When the computer program or the instruction is run on a computer, the computer is enabled to perform the session management method according to any one of the fifth aspect or the possible implementations of the fifth aspect.

According to a sixteenth aspect, an embodiment of this application provides a computer program product including an instruction. When the instruction is run on a computer, the computer is enabled to perform the session management method described in the first aspect or the possible implementations of the first aspect.

According to a seventeenth aspect, this application provides a computer program product including an instruction. When the instruction is run on a computer, the computer is enabled to perform the session management method described in the second aspect or the possible implementations of the second aspect.

According to an eighteenth aspect, an embodiment of this application provides a computer program product including an instruction. When the instruction is run on a computer, the computer is enabled to perform the session management method described in the third aspect or the possible implementations of the third aspect.

According to a nineteenth aspect, this application provides a computer program product including an instruction. When the instruction is run on a computer, the computer is enabled to perform the session management method described in the fourth aspect or the possible implementations of the fourth aspect.

According to a twentieth aspect, this application provides a computer program product including an instruction. When the instruction is run on a computer, the computer is enabled to perform the session management method described in the fifth aspect or the possible implementations of the fifth aspect.

According to a twenty-first aspect, an embodiment of this application provides a communications system. The communications system includes any one or more of the following: the first control plane network element described in the sixth aspect and the possible implementations of the sixth aspect and the second control plane network element described in the eighth aspect and the possible implementations of the eighth aspect.

According to a twenty-second aspect, an embodiment of this application provides a session management apparatus. The session management apparatus includes a processor and a storage medium. The storage medium stores an instruction. When the instruction is run by the processor, the session management method described in the first aspect or the possible implementations of the first aspect is implemented.

According to a twenty-third aspect, an embodiment of this application provides a session management apparatus. The session management apparatus includes a processor and a storage medium. The storage medium stores an instruction. When the instruction is run by the processor, the session management method described in the second aspect or the possible implementations of the second aspect is implemented.

According to a twenty-fourth aspect, an embodiment of this application provides a session management apparatus. The session management apparatus includes a processor and a storage medium. The storage medium stores an instruction. When the instruction is run by the processor, the session management method described in the third aspect or the possible implementations of the third aspect is implemented.

According to a twenty-fifth aspect, an embodiment of this application provides a session management apparatus. The session management apparatus includes a processor and a storage medium. The storage medium stores an instruction. When the instruction is run by the processor, the session management method described in the fourth aspect or the possible implementations of the fourth aspect is implemented.

According to a twenty-sixth aspect, an embodiment of this application provides a session management apparatus. The session management apparatus includes a processor and a storage medium. The storage medium stores an instruction. When the instruction is run by the processor, the session management method described in the fifth aspect or the possible implementations of the fifth aspect is implemented.

According to a twenty-seventh aspect, this application provides a chip. The chip includes at least one processor and a communications interface. The communications interface and the at least one processor are interconnected by using a line. The processor is configured to run an instruction, to perform the session management method according to any one of the first aspect to the twelfth possible implementation of the first aspect.

According to a twenty-eighth aspect, this application provides a chip. The chip includes at least one processor and a communications interface. The communications interface and the at least one processor are interconnected by using a line. The processor is configured to run an instruction, to perform the session management method according to any one of the second aspect to the fifth possible implementation of the second aspect.

According to a twenty-ninth aspect, this application provides a chip. The chip includes at least one processor and a communications interface. The communications interface and the at least one processor are interconnected by using a line. The processor is configured to run an instruction, to perform the session management method according to any one of the third aspect to the fifth possible implementation of the third aspect.

According to a thirtieth aspect, this application provides a chip. The chip includes at least one processor and a communications interface. The communications interface and the at least one processor are interconnected by using a line. The processor is configured to run an instruction, to perform the session management method according to any one of the fourth aspect to the fifth possible implementation of the fourth aspect.

According to a thirty-first aspect, this application provides a chip. The chip includes at least one processor and a communications interface. The communications interface and the at least one processor are interconnected by using a line. The processor is configured to run an instruction, to perform the session management method according to any one of the fifth aspect to the fifth possible implementation of the fifth aspect.

The communications interface in the chip may be an input/output interface, a pin, a circuit, or the like.

Optionally, the chip described above in this application further includes at least one memory. The at least one memory stores an instruction. The memory may be a storage unit inside the chip, for example, a register or a cache, or may be a storage unit (for example, a read-only memory or a random access memory) outside the chip.

For specific content of the information about the first terminal, the information about the second terminal, and the QoS parameter information in the second aspect to the thirty-first aspect and the implementations of the second aspect to the thirty-first aspect in the embodiments of this application, refer to the descriptions in the first aspect. Details are not described herein again.

For beneficial effects of the second aspect to the thirty-first aspect and the implementations of the second aspect to the thirty-first aspect in this application, refer to the analysis of the beneficial effects in the first aspect and the implementations of the first aspect. Details are not described herein again.

BRIEF DESCRIPTION OF DRAWINGS

FIG. 11A, FIG. 11B, and FIG. 11C are schematic diagrams of a specific procedure of a session management method according to an embodiment of this application;

FIG. 15A, FIG. 15B, and FIG. 15C are schematic diagrams of a specific procedure of a session management method according to an embodiment of this application;

DESCRIPTION OF EMBODIMENTS

To clearly describe the technical solutions in embodiments of this application, terms such as "first" and "second" are used in the embodiments of this application to distinguish between same items or similar items that have basically same functions and effects. For example, a first network and a second network are merely intended to distinguish between different networks, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in this application, the word such as "exemplary" or "for example" is used to represent giving an example, an illustration, or a description. Any embodiment or design solution described as "exemplary" or "for example" in this application should not be construed as being preferred or advantageous over another embodiment or design solution. Exactly, use of the word such as "exemplary" or "for example" is intended to present a relative concept in a specific manner.

In this application, "at least one" refers to one or more, and "a plurality of" refers to two or more. The term "and/or" describes an association relationship between associated objects and represents three relationships may exist. For example, A and/or B may represent the following three cases: Only A exists, both A and B exist, and only B exists. A and B may be in a singular or plural form. The character "|" generally indicates an "or" relationship between the associated objects. "At least one of the following items" or a similar expression indicates any combination of the items, and includes any combination of singular items or plural items. For example, at least one of a, b, or c may represent a, b, c, a combination of a and b, a combination of a and c, a combination of b and c, or a combination of a, b, and c, where a, b, and c may be in a singular or plural form.

Figure 1:
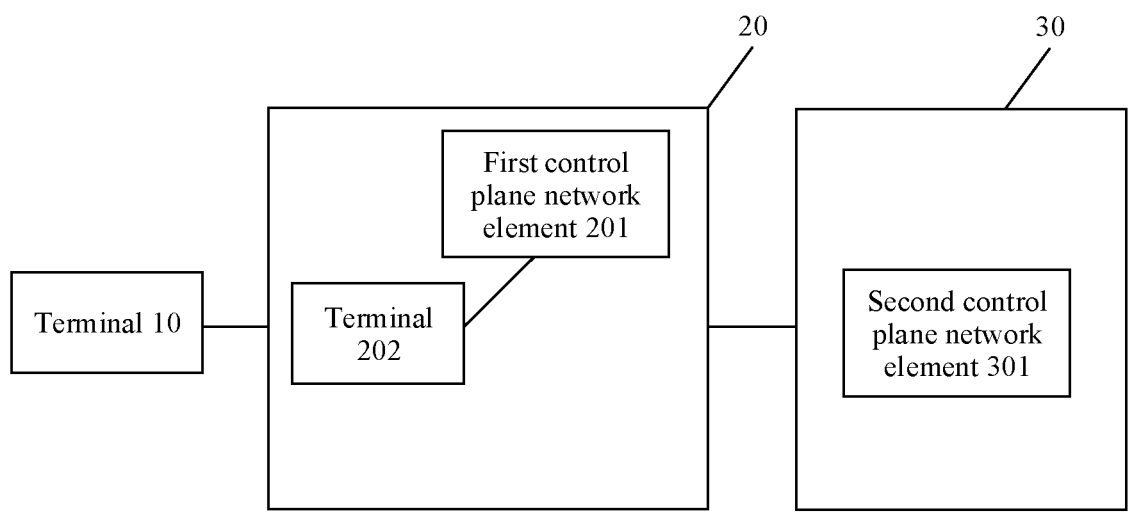
FIG. 1 is a schematic diagram of a communications system according to an embodiment of this application.

FIG. 1 is a schematic diagram of a communications system according to an embodiment of this application. The communications system includes a terminal 10, a first network 20, and a second network 30. The terminal 10 accesses the second network 30 by using the first network 20.

The first network 20 includes a first control plane (CP) network element 201 and a terminal 202. The second network 30 includes a second control plane network element 301.

The first network 20 is a network a first terminal 202 registers with. It may also be understood as that the first network 20 includes network elements that serve the terminal 202 and that is in a core network with which the terminal 202 registers. The second network 30 is a network the terminal 10 registers with. It may also be understood as that the second network 30 includes network elements that serve the terminal 10 and that is in a core network with which the terminal 10 registers.

It should be understood that in this embodiment of this application, the terminal 10 and the terminal 202 may register with a same core network or a different core network.

For example, the first network and the second network each may include same network elements or different network elements on a same public land mobile network (PLMN), or may include different network elements on different PLMNs.

For example, if the core network with which the terminal 202 registers is a 4G core network (for example, an evolved packet core (EPC)), the first network 20 includes network elements that serve the terminal 202 and that are in the 4G core network.

For example, if the core network with which the terminal 10 registers is a 5G core (5GC) network, the second network 30 includes network elements that serve the terminal 10 and that are in the 5G core network.

Alternatively, the core networks with which the terminal 202 and the terminal 10 register are both SGCs.

For example, a first control plane network element 201 and the second control plane network element 301 in this embodiment of this application are mainly responsible for user registration authentication, mobility management, and delivering a data packet forwarding policy, a QoS control policy, and the like to a user plane function (UPF).

For example, network elements corresponding to the first control plane network element 201 and the second control plane network element 301 may be one or more of a mobility management network elements, a policy control network element, or a session management network element.

The 4G core network is used as an example. The mobility management network element may be a mobility management entity (MME). The policy control network element may be a policy and charging rules function (PCRF) unit. In addition, in the 4G core network, the first control plane network element 201 may alternatively be a home subscriber server (HSS).

Figure 2:
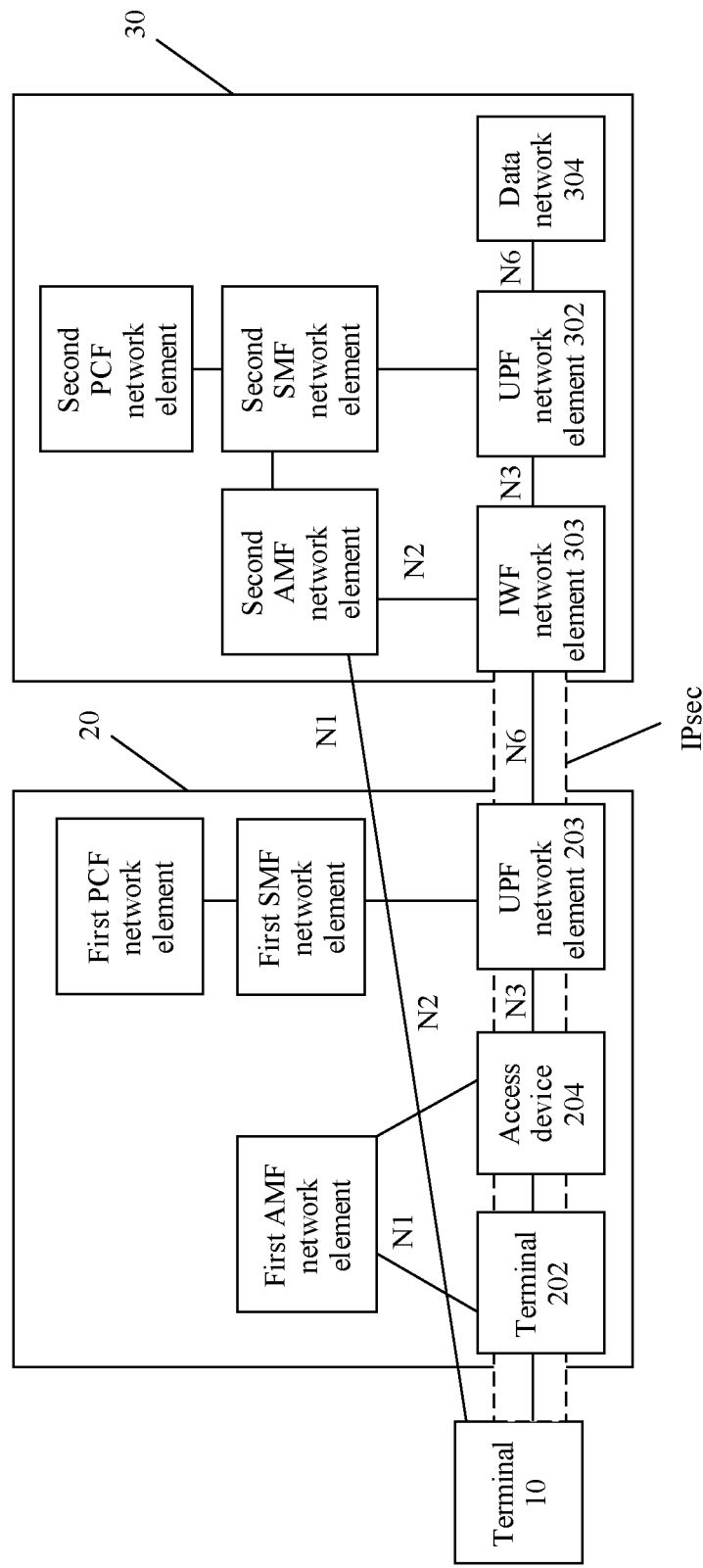
FIG. 2 is a schematic diagram of a communications system according to an embodiment of this application.

As shown in FIG. 2, that the communications system shown in FIG. 1 is applied to a 5G network architecture is used as an example. The network structure shown in FIG. 2 may be referred to as a fixed-mobile convergence network architecture. In the network architecture shown in FIG. 2, the mobility management network element may be an access and mobility management function (AMF) network element. The policy control network element may be a policy control function (PCF) network element. The session management network element may be a session management function (SMF) network element. In other words, the first control plane network element 201 may be any one of a first SMF network element, a first AMF network element, a first PCF network element, and a first unified data management (UDM) network element. The second control plane network element 301 may be any one of a second SMF network element, a second AMF network element, a second PCF network element, and a second UDM network element.

In addition, as shown in FIG. 2, the 5G network architecture may further include a user plane function (UPF) network element 203, a UPF network element 302, an interworking function (IWF) network element 303, and a data network DN 304. The user plane function network element 203 belongs to the first network 20, and the UPF network element 302 and the IWF network element 303 belong to the second network 30. The user plane function network element 203 is configured to transmit user plane data of the terminal 202.

A UPF network element is a user plane gateway, and is mainly responsible for packet data packet forwarding, QoS control, charging information statistics, and the like. For example, user plane data is transmitted to the DN 304 via the UPF network element 302. The DN 304 is configured to serve the terminal 10, for example, provide a mobile operator service, an internet service, or a third-party service.

An internet protocol security (IPsec) tunnel is established between the terminal 10 and the IWF network element 303. The IPsec tunnel is used to transmit user plane data of the terminal 10 to the second network. As shown in FIG. 2, tunnel endpoints of the IPsec tunnel include the terminal 10 and the IWF network element 303. The user plane data of the terminal 10 may be transmitted to the IWF network element 303 through the IPsec tunnel, and finally transmitted to the UPF network element 302 in the second network.

For example, an access device 204 is an access network device, and may be a radio access network (for example, a next generation radio access network (NG RAN)) or a wireline access network/fixed access network (W-SGAN) such as an access gateway function (AGF) or a network gateway control device (BNG).

In the system architecture shown in FIG. 1 or FIG. 2, the terminal 10 accesses the second network 30 by using the terminal 202. The terminal 10 sends data to the second network 30 by using the terminal 202 and a data transmission channel between the first network 20 and the second network 30.

Specifically, the user plane data of the terminal 10 is first transmitted to the user plane function network element 203 via a user plane of the terminal 202. Then, the UPF network element 203 transmits the user plane data of the terminal 10 to the IWF network element 303 in the second network 30. During specific implementation, the IPsec tunnel is established between the terminal 10 and the IWF network element 303 to transmit the user plane data of the terminal 10. The user plane data of the terminal 10 may be transmitted in the first network 20 as the user plane data of the terminal 202. Then, the UPF network element 203 in the first network 10 transmits the user plane data of the terminal 10 to the IWF network element 303. The IWF network element 303 transmits the received user plane data of the terminal 10 to the UPF network element 302. Then, the UPF network element 302 transmits the user plane data of the terminal 10 to the DN 304.

Figure 3:
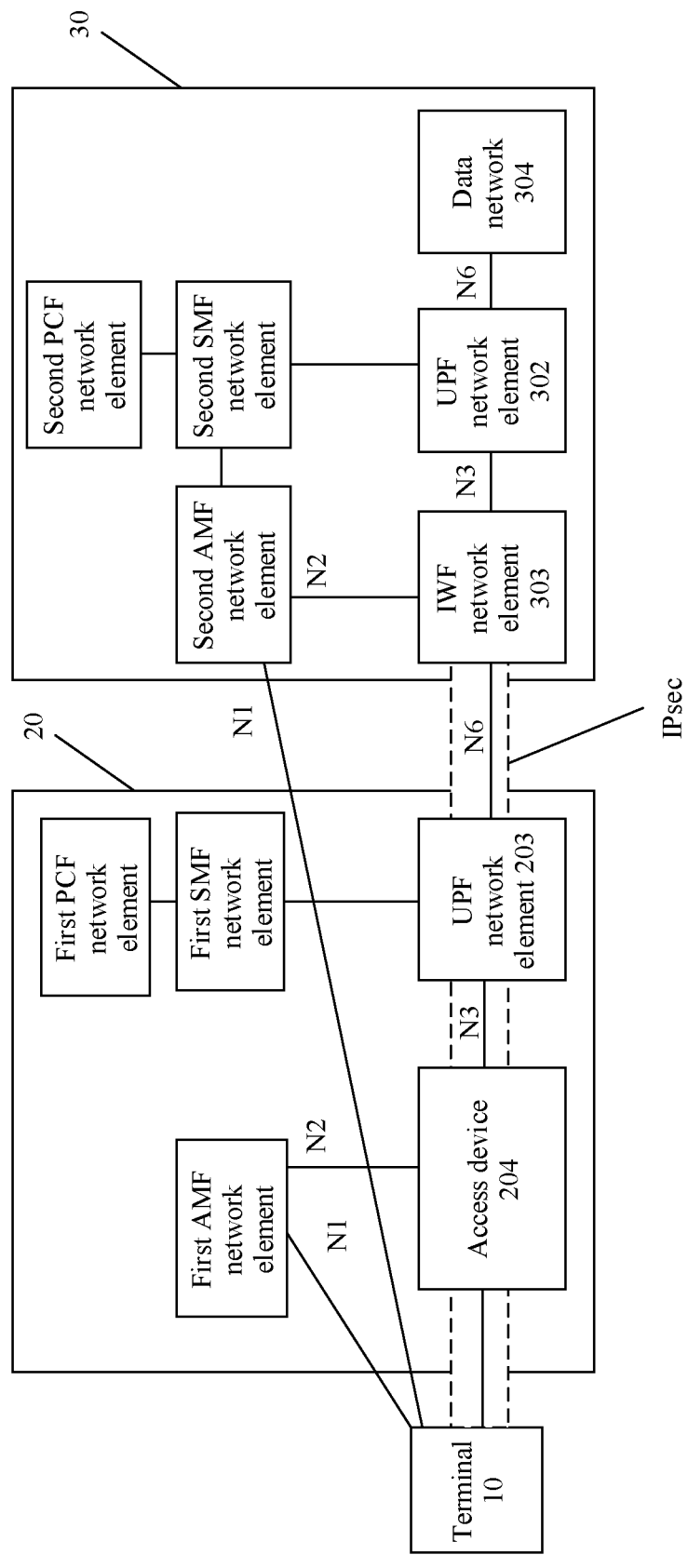
FIG. 3 is a schematic diagram of a communications system according to an embodiment of this application.

FIG. 3 shows another network architecture according to an embodiment of this application. The network architecture may be referred to as a private network architecture. A difference between the network structure shown in FIG. 3 and the network architecture shown in FIG. 2 lies in that there is the terminal 202 and the terminal 10 in FIG. 2. In addition, in the network architecture shown in FIG. 3, the terminal 10 is further connected to the first AMF network element.

In FIG. 3, the first network is a network with which the terminal 202 and the terminal 10 register. The first network and the second network each may include same or different network elements on a same PLMN, or may include different network elements on different PLMNs.

In FIG. 3, there is only the terminal 10. That is, the IPsec tunnel is established between the terminal 10 and the IWF network element 303. The terminal 10 accesses the first network by using the access device 204. Then, the terminal 10 accesses the second network 30 by using the first network 20. For functions of other network elements and interaction interfaces between the network elements, refer to the description in FIG. 2. A same part is not described herein again.

In addition, in a 5G architecture, in addition to the first control plane network element 201 and the UPF network element 203 in the first network 20, and in addition to the second control plane network element 201 and the UPF network element 302 in the second network 30, there may be another network element on either of the first network 20 and the second network 30. Another network element in the first network 20 in the 5G architecture is used as an example. For another network element in the second network 30 in the 5G architecture, refer to a description about the first network 20 in the 5G architecture.

Figure 4:
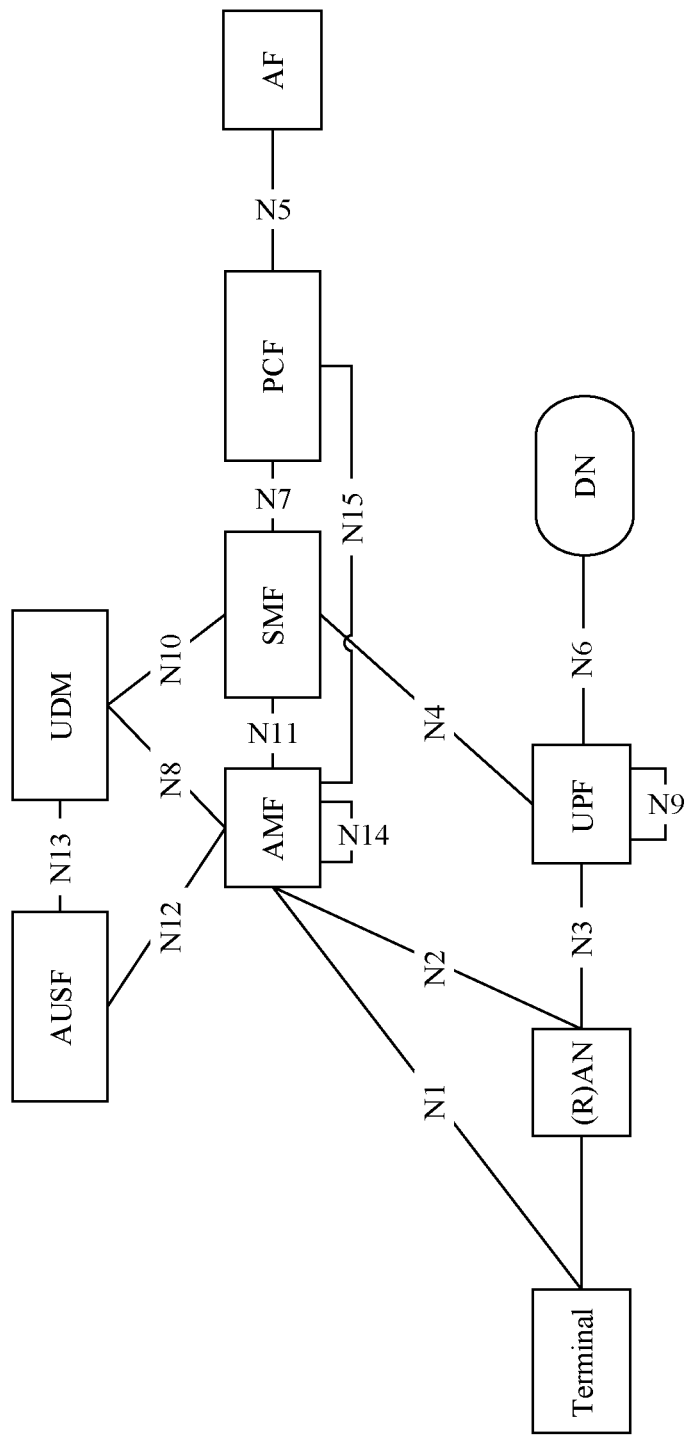
FIG. 4 is a schematic diagram of a 5G network architecture according to an embodiment of this application.

As shown in FIG. 4, the 5G network architecture may further include a data network (DN), an authentication server function (AUSF) network element, a unified data repository (UDR), or a binding support function (BSF), a network exposure function (NEF) network element, a network repository function (NRF) network element, an application function (AF), and the like. This is not specifically limited in this embodiment of this application.

It should be noted that in the 5G network architecture, a function of the IWF network element 303 is equivalent to a function of an access device.

A terminal communicates with an AMF network element by using a next generation (N1) network interface (N1 for short). The access device communicates with the AMF network element by using an N2 interface (N2 for short). The access device communicates with a UPF network element by using an N3 interface (N3 for short). The UPF network element communicates with the DN by using an N6 interface (N6 for short). Any two UPF network elements communicate with each other by using an N9 interface (N9 for short). The UPF network element communicates with an SMF network element by using an N4 interface (N4 for short). The AMF network element communicates with the SMF network element by using an N11 interface (N11 for short). The AMF network element communicates with a UDM network element by using an N8 interface (N8 for short). The SMF network element communicates with a PCF network element by using an N7 interface (N7 for short). The SMF network element communicates with the UDM network element by using an N10 interface (N10 for short). The AMF network element communicates with the AUSF network element by using an N12 interface (N12 for short). The AMF network element communicates with an NSSF network element by using an N22 interface (N22 for short). The AUSF network element communicates with the UDM network element by using an N13 interface (N13 for short). The UDM network element communicates with the UDR network element. A PCF network element communicates with the UDR network element. The BSF network element communicates with the PCF network element and the SMF network element.

It should be understood that, in the network architecture shown in FIG. 4, control plane network elements may alternatively interact with each other by using a service-oriented interface. For example, the AMF network element, the AUSF network element, the SMF network element, the UDM network element, the UDR network element, the NRF network element, the NEF network element, the NSSF network element, or the PCF network element interacts with one another by using a service-oriented interface. For example, an external service-oriented interface provided by the AMF network element may be Namf. An external service-oriented interface provided by the SMF network element may be Nsmf. An external service-oriented interface provided by the UDM network element may be Nudm. An external service-oriented interface provided by the UDR network element may be Nudr. An external service-oriented interface provided by the PCF network element may be Npcf. An external service-oriented interface provided by the BSF network element may be Nbsf. An external service-oriented interface provided by the NEF network element may be Nnef. An external service-oriented interface provided by the NRF network element may be Nnrf. An external service-oriented interface provided by the NSSF network element may be Nnssf. An external service-oriented interface provided by an NWDAF network element may be Nnwdaf. It should be understood that, for related descriptions of names of various service-oriented interfaces in FIG. 3, refer to a 5G system architecture diagram in the 23501 standard. Details are not described herein.

It should be noted that FIG. 4 merely shows an example of one UPF network element and one SMF network element. Certainly, the figure may include a plurality of UPF network elements and a plurality of SMF network elements, for example, include an SMF network element 1 and an SMF network element 2. This is not specifically limited in this embodiment of this application. For a manner in which network elements are connected to each other, refer to the network architecture shown in FIG. 4. Details are not described one by one herein again. It should be noted that names of interfaces between the network elements in FIG. 4 are only an example, and the interfaces may have other names during specific implementation. This is not specifically limited in this embodiment of this application.

It should be noted that the access device, the AF network element, the AMF network element, the SMF network element, the AUSF network element, the UDM network element, the UPF network element, the PCF network element, and the like in FIG. 4 are merely names, and the names do not constitute any limitation on the devices. In a 5G network and future network, network elements corresponding to the access device, the AF network element, the AMF network element, the SMF network element, the AUSF network element, the UDM network element, the UPF network element, and the PCF network element may have other names. This is not specifically limited in this embodiment of this application. For example, the UDM network element may be further replaced with a home subscriber server (HSS), a user subscription database (USD), a database entity, or the like. This is uniformly described herein. Details are not described below again.

It should be noted that a network architecture in the embodiments of this application is not limited to the 5G fixed-mobile convergence network architecture, and any architecture in which a terminal accesses the second network by using the first network is applicable to the embodiments of this application. The first network or the second network may be a private network, a long-term evolution (LTE) network, a MulteFire network, a home base station network, a non-3GPP access mobile network such as Wi-Fi, a global system for mobile communications (GSM) network, or a global packet radio service (GPRS) network, a wideband code division multiple access WCDMA network, a future 6G network, or the like. An access network (AN) in the first network may be an NG RAN, an AGF or a BNG that is accessed by using a fixed network, a wireline AN, a private network access network, a MultiFire access network, or an untrusted access (N3IWF) or trusted access gateway.

Optionally, a first terminal or a second terminal in the embodiments of this application may include various devices that have a wireless communication function and that can be connected to a mobile network, for example, a handheld device, a vehicle-mounted device, a wearable device, a computing device, or another processing device connected to a wireless modem, or may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, or relay user equipment. For example, the relay user equipment may be, for example, a 5G residential gateway (RG).

One terminal may serve as both the first terminal and the second terminal.

Functions of the network elements in FIG. 2 to FIG. 4 are described as follows:

Capabilities of the AMF network element include a function related to access and mobility, such as connection management, mobility management, registration management, access authentication and authorization, reachability management, or security context management.

Capabilities of the SMF network element include a function related to a session, such as session management (for example, session establishment, modification, and release, including tunnel maintenance between the UPF and a RAN), selection and control of the UPF network element, service and session continuity (SSC) mode selection, or roaming.

Capabilities of the PCF network element include functions related to a policy, such as formulating a unified policy, providing policy control, and obtaining subscription information related to a policy decision from the UDR.

Capabilities of the NSSF network element include selecting a group of network slice instances for the terminal, determining allowed NSSAI and determining an AMF network element set that can serve the terminal, or the like.

Capabilities of the NRF network element include a service discovery function and maintaining NF text of an available network function (NF) instance and a service supported by the NF instance.

The AF network element interacts with a 3GPP core network to provide a service, including interacting with the NEF, interacting with a policy architecture, or the like.

Capabilities of the NEF network element include securely exposing a service and a capability provided by a 3GPP network function, including internally exposing the service and the capability, exposing the service and the capability to a third party, or the like, and converting or translating information exchanged with the AF and information exchanged with an internal network function, for example, an AF service identifier and internal 5G core network information such as a data network name (DNN), a single network slice selection assistance information (S-NSSAI) identifier, and the like.

The UDM supports processing of a letter of credence for authentication, user identity processing, access authorization, registration and mobility management, subscription management, short message management, or the like in a 3GPP authentication key agreement mechanism.

The AUSF network element interacts with the UDM to obtain user information, and performs an authentication-related function, for example, generating an intermediate key.

The UDR is configured to store subscription data (Subscribed Data), policy data, application data, and the like.

Figure 5:
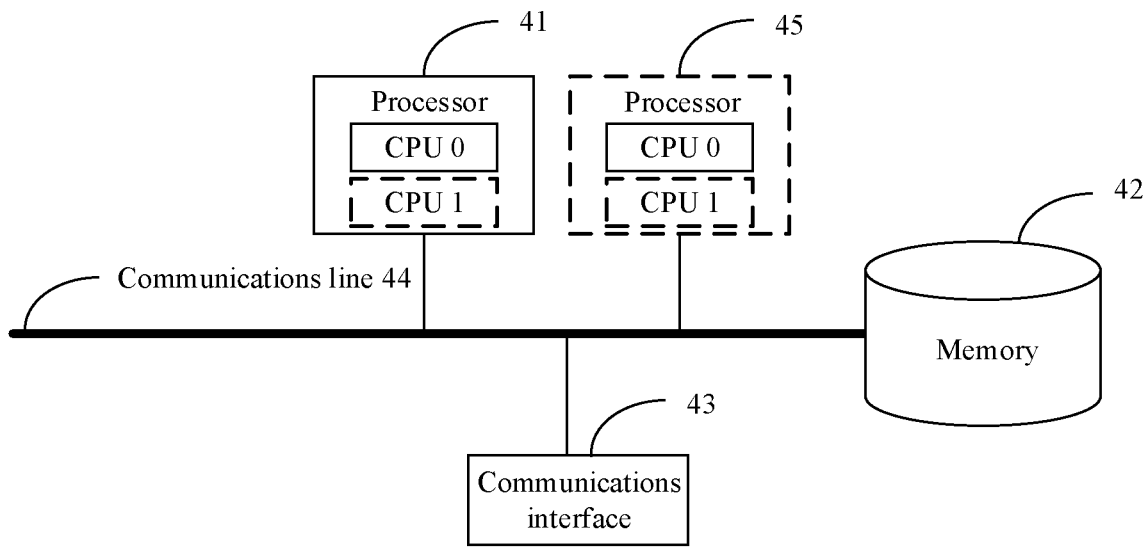
FIG. 5 is a schematic structural diagram of a communications device according to an embodiment of this application.

FIG. 5 is a schematic diagram of a hardware structure of a communications device according to an embodiment of this application. For hardware structures of the first terminal, the second terminal, a first control plane network element, a second control plane network element, a first user plane network element, and a second user plane network element in the embodiments of this application, refer to the schematic diagram of the hardware structure of the communications device shown in FIG. 5. The communications device includes a processor 41, a communications line 44, and at least one communications interface (in FIG. 5, that the communications device includes a communications interface 43 is merely used as an example for description).

The processor 41 may be a general-purpose central processing unit (CPU), a microprocessor, an application-specific integrated circuit (ASIC), or one or more integrated circuits configured to control program execution of the solutions in this application.

The communications line 44 may include a path on which information is transferred between the foregoing components.

The communications interface 43 is configured to communicate with another device or a communications network such as the Ethernet, a radio access network (RAN), or a wireless local area network (WLAN) by using any apparatus such as a transceiver.

Optionally, the communications device may further include a memory 42.

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the communications line 44. The memory may alternatively be integrated with the processor.

The memory 42 is configured to store a computer-executable instruction for executing the solutions in this application, and the execution is controlled by the processor 41. The processor 41 is configured to execute the computer-executable instruction stored in the memory 42, to implement a session management method provided in the following embodiments of this application.

Optionally, the computer-executable instruction in this embodiment of this application may also be referred to as application program code. This is not specifically limited in this embodiment of this application.

During specific implementation, in an embodiment, the processor 41 may include one or more CPUs, for example, a CPU 0 and a CPU 1 shown in FIG. 5.

During specific implementation, in an embodiment, the communications device may include a plurality of processors such as the processor 41 and a processor 45 in FIG. 5. Each of the processors may be a single-core (single-CPU) processor or a multi-core (multi-CPU) processor. The processor herein may be one or more devices, circuits, and/or processing cores for processing data (for example, computer program instructions).

The session management method provided in the embodiments of this application is specifically described with reference to FIG. 1 to FIG. 4.

It should be noted that names of messages between network elements, names of parameters in the messages, or the like in the following embodiments of this application are merely an example, and there may be other names during specific implementation. This is not specifically limited in the embodiments of this application.

Figure 6:
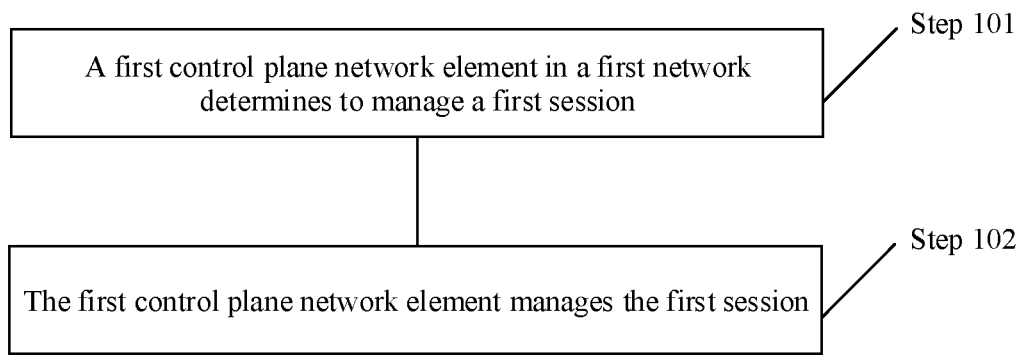
FIG. 6 is a schematic flowchart of a session management method according to an embodiment of this application.

FIG. 6 is a schematic diagram of a session management method according to an embodiment of this application. The method includes the following steps.

Step 101: A first control plane network element in a first network determines to manage a first session.

The first session is used to provide a connection first network for a second terminal in the. The first control plane network element is a network element in the first network.

The first network includes network elements on a network with which a first terminal registers. A second network includes network elements on a network with which the second terminal registers. The first network and the second network each may include same or different network elements on a same PLMN, or may include different network elements on different PLMNs. For example, the first terminal is the terminal 202 in FIG. 2. The first control plane network element may be any one of a first SMF network element, a first AMF network element, a first PCF, and a first UDM network element in the first network.

For example, the first network may be the first network 20 shown in FIG. 2 or FIG. 3. For FIG. 2, the first network 20 includes the terminal 202, the UPF network element 203, the first AMF network element, the first SMF network element, the first PCF network element, and the access device 204. For FIG. 3, the first network 20 includes the UPF network element 203, the first AMF network element, the first SMF network element, the first PCF network element, and the access device 204.

For example, a session in this embodiment of this application may be a packet data unit (PDU) or a public data network (PDN) connection. That the session in this embodiment of this application is a PDU session is used as an example. The first session in this embodiment of this application refers to a first data transmission channel that is established by a first session management network element in the first network and that connects the terminal 10 to the UPF network element 203 in the first network. It should be understood that the second terminal in step 101 may be the terminal 10 shown in FIG. 2 or FIG. 3.

For the network architecture shown in FIG. 2, network elements in the first data transmission channel include the terminal 10, the terminal 202, the access device 204, and the UPF network element 203 selected by the first SMF network element for the first session. The first data transmission channel includes links between a plurality of pairs of adjacent network elements, for example, includes a link between the terminal 10 and the terminal 202, a link between the terminal 202 and the access device 204, and a link between the access device 204 and the UPF network element 203.

For the network architecture shown in FIG. 3, network elements in the first data transmission channel include the terminal 10, the access device 204, and the UPF network element 203 selected by the first SMF network element for the first session. The first data transmission channel includes links between a plurality of pairs of adjacent network elements, for example, includes a link between the terminal 10 and the access device 204 and the link between the access device 204 and the UPF network element 203.

Step 102: The first control plane network element manages the first session.

For example, that the first control plane network element manages the first session in this embodiment of this application includes: directly initiating, by the first control plane network element, a first session modification procedure or a first session delete procedure, or sending, by the first control plane network element, a session management request message for the first session to a first session management network element in the first network, a terminal in the first network, a first policy management network element in the first network, or a first subscription management network element in the first network, to request the first session management network element in the first network, the terminal in the first network, the first policy management network element in the first network, or the first subscription management network element in the first network to initiate a session modification procedure or a session deletion procedure based on the session management request message for the first session.

This embodiment of this application provides the session management method. The first control plane network element is for determining that the first session needs to be managed, and then perform a process of managing the first session. In this way, for a network architecture in which the second terminal accesses the second network by using the first network, a quality of service (QoS) parameter that is for transmitting user plane data of the second terminal and that is in the first network can be changed through the management of the first session in the first network. Compared with the prior art in which fixed and unified QoS is used to transmit the user plane data of the second terminal, accurate QoS assurance can be provided for the user plane data of the second terminal.

Regardless of the network architecture shown in FIG. 2 or FIG. 3, the first control plane network element may determine, when determining that a preset condition is met, to manage the first session. For example, the preset condition may be triggering that is based in a second control plane network element in the second network (passive triggering for short), or may be that the first control plane network element identifies that the first session needs to be managed (active identification for short). The passive triggering and the active identification are separately described as follows:

(1) Active Identification

Figure 7:
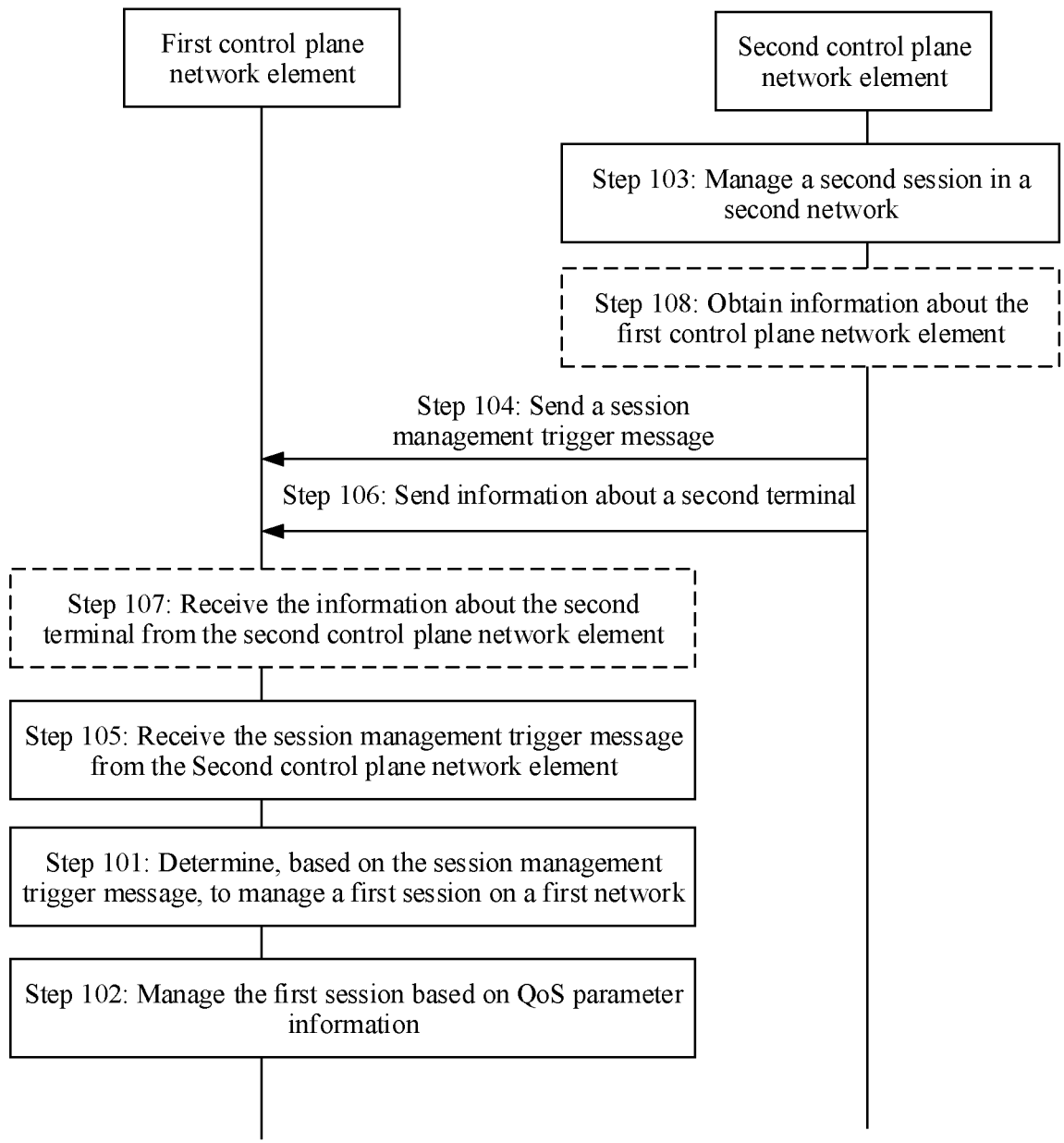
FIG. 7 is a schematic flowchart of a session management method according to an embodiment of this application.

In a possible embodiment, as shown in FIG. 7, step 101 in this embodiment of this application may be specifically implemented in the following manner: The first control plane network element determines that a second QoS parameter that is of user plane data of the second terminal in the second network and that is in the second network is inconsistent with a first QoS parameter that is of user plane data of the second terminal in the first network and that is in the first network, and the first control plane network element determines to manage the first session, where the second network is a network accessed by the second terminal by using the first network.

It should be noted that, that the first control plane network element determines that the second QoS parameter that is of the user plane data of the second terminal in the second network and that is in the second network is inconsistent with the first QoS parameter that is of the user plane data of the second terminal in the first network and that is in the first network is equivalent to that the first control plane network element determines that the second QoS parameter that is of the user plane data of the second terminal in the second network and that is in the second network is inconsistent with a first QoS parameter of the user plane data in the first network.

It should be noted that the user plane data of the second terminal in the second network and the user plane data of the second terminal in the first network may be same data.

It should be understood that the user plane data in this embodiment of this application may alternatively be replaced with a service flow.

For example, the user plane data of the second terminal is transmitted to the second network by using the first network. In a process of transmitting the user plane data of the second terminal in the first network, the UPF network element 203 in the first network may determine the second QoS parameter in the user plane data of the second terminal, and then feed back the second QoS parameter to the first control plane network element.

That the second QoS parameter is inconsistent with the first QoS parameter in this embodiment of this application may mean that the second QoS parameter is completely different from the first QoS parameter, or the second QoS parameter and the first QoS parameter do not comply with a preconfigured mapping relationship. For example, QoS identifiers of the user plane data are different, or the QoS identifiers do not comply with the preconfigured mapping relationship.

For example, the second network may be the second network 30 shown in FIG. 2 or FIG. 3. The second network 30 may include the second AMF network element, the second PCF network element, the second SMF network element, the IWF network element 303, the UPF network element 302, and the DN 304.

For example, if the first control plane network element determines that user plane data 1 of the second terminal is transmitted in the second network by using a QoS flow 1, and user plane data 2 is transmitted in the first network by using a QoS flow 2, the first control plane network element may determine that the first session needs to be managed. It should be understood that a QoS flow may correspond to a resource that ensures highly reliable transmission of user plane data.

Correspondingly, in a procedure shown in FIG. 7, step 102 in this embodiment of this application may be implemented in the following manner: The first control plane network element manages the first session based on the second QoS parameter.

For example, the first control plane network element initiates a session management process to the first session by using the second QoS parameter as a target QoS parameter. Alternatively, the first control plane network element initiates a session management process to the first session by using, as a target QoS parameter, a preconfigured QoS parameter mapped to the second QoS parameter.

It should be understood that after the first control plane network element determines to manage the first session, the first control plane network element may initiate the session management procedure to update QoS of the first session, so that the user plane data 2 is also transmitted in the first network by using the QoS flow 1.

The session management procedure in this embodiment of this application may be a session establishment procedure, a session update (which may also be referred to as session modification) procedure, or a session deletion procedure.

(2) Passive Triggering

In another possible embodiment, as shown in FIG. 7, the method provided in this embodiment of this application further includes the following steps.

Step 103: The second control plane network element in the second network manages a second session in the second network.

The second session is used to provide a connection in the second network for the second terminal.

FIG. 2 is used as an example. The second session in this embodiment of this application refers to a second data transmission channel that is established by a second session management network element in the second network and that connects the terminal 10 to the UPF network element 302.

That the second control plane network element manages the second session includes: directly initiating, by the second control plane network element, a session modification procedure or a session deletion procedure, or sending, by the second control plane network element, a session management request message for the second session to the second session management network element in the second network, the second terminal in the second network, or a second policy management network element or a second subscription management network element in the second network, to request the second session management network element, the second terminal in the second network, or the second policy management network element or the second subscription management network element in the second network to initiate a session modification procedure or a session deletion procedure for the second session.

Step 104: The second control plane network element sends a session management trigger message to the first control plane network element in the first network, where the second terminal accesses the second network by using the first network, the session management trigger message requests to manage the first session in the first network, and the first session is used to provide the connection in the first network for the second terminal.

For example, the session management trigger message may be a session establishment/modification/deletion trigger request.

It should be noted that the session management trigger message in step 104 may be sent by the second control plane network element to the first control plane network element when or after the second control plane network element performs a second session management process.

It should be understood that after performing an operation such as establishment/modification/deletion in the second session in the second network, the second control plane network element may trigger the first control plane network element to manage the first session in the first network.

Step 105: The first control plane network element receives the session management trigger message from the second control plane network element.

Correspondingly, step 101 may be specifically implemented in the following manner: The first control plane network element determines, based on the session management trigger message, to manage the first session in the first network.

In a first optional implementation, to enable the first session to meet, after the first control plane network element may determine to perform a session management procedure in the first session, a QoS requirement for transmitting user plane data of the second terminal in the first network, the session management trigger message may further include QoS parameter information used to determine a QoS requirement for transmitting the user plane data of the second terminal in the first network.

It should be understood that the QoS parameter information in this embodiment of this application may be a QoS parameter used when the user plane data of the second terminal is transmitted in the second network, or may be a QoS requirement that is determined by the second control plane network element and that is used when the user plane data of the second terminal is transmitted in the first network.

Correspondingly, step 102 may be specifically implemented in the following manner: The first control plane network element manages the first session based on the QoS parameter information.

For example, the first control plane network element initiates a session management process to the first session by using the QoS parameter information as a target QoS parameter, or the first control plane network element initiates a session management process to the first session by using, as a target QoS parameter, a preconfigured QoS parameter mapped to the QoS parameter information.

Specifically, the first control plane network element initiates the session management procedure based on the QoS parameter information, so that after the first control plane network element performs the session management procedure in the first session, user plane data transmitted in the first session can meet the QoS requirement.

It should be understood that if the first control plane network element is a first AMF network element, the first AMF network element may instruct the first PCF network element, the second terminal, the first SMF network element, or the first UDM network element to trigger the session management procedure. In this case, the first AMF network element may send the QoS parameter information and information used to determine the first session to the first PCF network element, the second terminal, the first SMF network element, or the first UDM network element.

If the first control plane network element is any one of the first PCF network element, the second terminal, the first SMF network element, or the first UDM network element, the first control plane network element may directly initiate the session management procedure to the first session.

In a second optional implementation, still with reference to FIG. 7, the method provided in this embodiment of this application further includes the following steps.

Step 106: The second control plane network element sends information about the second terminal and/or information about the first terminal to the first control plane network element, where the information about the second terminal is for determining the first session, and the information about the first terminal is for determining the first session.

Step 107: The first control plane network element receives the information about the second terminal and/or the information about the first terminal from the second control plane network element.

Correspondingly, step 101 may alternatively be implemented in the following manner: The first control plane network element determines, based on the information about the second terminal and/or the information about the first terminal, to manage the first session.

For example, the information about the second terminal may be information that can be used to identify the first session that provides the connection the second terminal for. For example, the information about the second terminal includes any one or more of the following information: an identifier of the second terminal, an identifier of the first session, an IP address of the second terminal, and an identifier of the second session. The second session is used to provide the connection in the second network for the second terminal.

For example, the information about the first terminal may be information that can be used to identify the first session. For example, the information about the first terminal includes any one or more of the following information: an identifier of the first terminal, the identifier of the first session, an IP address of the first terminal, and the identifier of the second session, where the second session is used to provide the connection in the second network for the second terminal.

For example, the identifier of the second terminal in this embodiment of this application may be one or more of the following: an internet protocol (IP) address, a subscription permanent identifier (SUPI), a permanent equipment identifier (PEI), a generic public subscription identifier (GPSI), an international mobile subscriber identity (international mobile subscriber identifier, IMSI), an international mobile equipment identity (IMEI), an IP 5-tuple, and a mobile station international integrated service digital network number (MSISDN). For an identifier of a terminal in the following embodiments, refer to the description herein. Details are not described subsequently again.

It should be understood that the identifier of the second session is used to identify the second session. If the information about the second terminal is the identifier of the second session, the first control plane network element may prestore a mapping relationship between the identifier of the first session and the identifier of the second session. In this way, after receiving the identifier of the second session, the first control plane network element may determine the identifier of the first session based on the mapping relationship between the identifier of the first session and the identifier of the second session. Further, the first control plane network element determines, based on the identifier of the first session, that the first session needs to be managed.

The IP address of the second terminal is a local IP address allocated by the first terminal to the second terminal. The second terminal may use the local IP address to establish a connection to an IWF network element. For example, when the second terminal establishes a connection to the first terminal, the first terminal allocates the local IP address to the second terminal.

Optionally, the information about the second terminal may be sent in the session management trigger message to the first control plane network element together with QoS parameter information. Alternatively, a separate message including the information about the second terminal may be sent to the first control plane network element. This is not limited in this embodiment of this application.

It should be noted that if the first control plane network element receives the QoS parameter information and the information about the second terminal, the first control plane network element determines the first session based on the information about the second terminal. The first control plane network element manages the first session based on the QoS parameter information.

For example, the QoS parameter information in this embodiment of this application includes any one or more of the following information: a service descriptor and a QoS indication. The service descriptor is for determining user plane data of the second terminal in the first network. The QoS indication indicates a requirement on a QoS resource used by the user plane data that is of the second terminal in the first network and that corresponds to the service descriptor.

It should be understood that the service descriptor is a description of the user plane data of the second terminal in the first network (there are a plurality of manners: 1. The service descriptor may be the identifier of the second terminal, and is used to identify first user plane data of the second terminal. 2. The service descriptor may be the identifier of the first session, the identifier of the second session, or the address of the second terminal, and is for determining user plane data of the second terminal in the second session/the first session. 3. The service descriptor may be a security parameter index (SPI), and is for determining user plane data on an IPsec tunnel. 4. The service descriptor may be a flow descriptor, for example, a part or all of a 5-tuple, and is for determining user plane data of a service flow. 5. The service descriptor may be a quality of service flow identifier (QFI) or a 5G QoS identifier (5QI), and is used to identify user plane data transmitted by using QoS. 6. The service descriptor may be a differentiated services code point (DSCP) identifier that is another identifier for identifying QoS.

It should be noted that the service descriptor in this embodiment of this application is generated by the second control plane network element, for example, to establish a relationship between a QoS parameter and a DSCP identifier, and send the service descriptor to the first control plane network element and the second user plane network element.

For example, the QoS indication is for determining a requirement on a QoS resource used for transmitting the user plane data that is of the second terminal in the first network and that corresponds to the transmission service descriptor. That is, the user plane data that is of the second terminal in the first network and that corresponds to the service descriptor may be transmitted by using a QoS flow corresponding to the QoS resource. For example, the QoS resource may be some resources on which the first user plane data can reach a specified bandwidth, latency, and jitter. The QoS flow corresponding to the QoS resource refers to a set of user plane data that is of the second terminal in the first network and that uses a same type of QoS resource.

For example, the QoS indication includes one or more of QoS parameters such as the QFI, the 5QI, an aggregate maximum bit rate (AMBR), and a TMBR.

In an optional embodiment, still with reference to FIG. 7, before step 106, the method provided in this embodiment of this application further includes the following steps.

Step 108: The second control plane network element obtains information about the first control plane network element.

The information about the first control plane network element is for determining the first control plane network element.

In an example, the second control plane network element prestores the information about the first control plane network element.

In another example, step 108 may be specifically implemented in the following manner: In a process in which the second terminal registers with the second network or in a process in which the second terminal manages the second session by using the second network, the second control plane network element obtains the information about the first terminal, where the first terminal is configured to provide a connection for the second terminal, and the second control plane network element determines the first control plane network element based on the information about the first terminal.

For example, in the process in which the second terminal registers with the second network, the second terminal sends the information about the first terminal to the second control plane network element. A specific process is as follows: In an implementation, the second terminal may send an authentication authorization accounting (AAA) message to the IWF network element, where the AAA message carries the information about the first terminal. The IWF network element sends an N2 message to a second AMF network element in the second network, where the N2 message carries the information about the first terminal. Alternatively, in another implementation, in the process in which the second terminal registers with the second network, the second terminal sends a registration request message to the second network by using the first terminal. Because the registration request message is forwarded by the first terminal to the second control plane network element, after processing the registration request message, the first terminal may forward, to the second control plane network element, the registration request message carrying the information about the first terminal. In still another example, alternatively, the second terminal initiates a second session management procedure, and the second terminal may send the information about the first terminal to the second control plane network element in the second session management procedure.

For example, the information about the first terminal in this embodiment of this application may be any information that can be used to identify the first terminal or a session of the first terminal. The information about the first terminal may be the identifier of the first terminal, an IP address of the first terminal, or a session identifier of the first terminal. For example, the first terminal is used as a residential gateway (RG).

In a possible implementation, that the second control plane network element determines the first control plane network element based on the information about the first terminal may be specifically implemented in the following manner: determining, by the second control plane network element based on the information about the first terminal, a first control plane network element connected to the first terminal.

For example, the determining, by the second control plane network element based on the information about the first terminal, a first control plane network element connected to the first terminal may be specifically implemented in any one or more of the following manner 1 to manner 3.

Manner 1: The information about the first terminal carries an identifier of the first control plane network element, and the second control plane network element determines the first control plane network element based on the identifier of the first control plane network element.

Manner 2: The second control plane network element determines the first control plane network element based on an association relationship between the information about the first terminal and the first control plane network element. The second control plane network element has the association relationship between the first terminal and the first control plane network element. The association relationship between the first terminal and the first control plane network element may be sent by the first control plane network element to the second control plane network element after the first terminal establishes a connection to the first control plane network element. Alternatively, the association relationship between the first terminal and the first control plane network element is obtained by the second control plane network element by using another network element.

Manner 3: The second control plane network element obtains an identifier of the first control plane network element from an NRF network element in the first network and a UDM network element in the first network based on the information about the first terminal. The NRF network element in the first network and the UDM network element in the first network store an association relationship between the first terminal and the first control plane network element. For example, the second control plane network element sends the information about the first terminal to the NRF network element or the UDM network element, and obtains the identifier of the first control plane network element from the NRF network element or the UDM network element.

For example, the second control plane network element is the second AMF network element, and the first control plane network element is a first AMF network element. The second AMF network element determines, based on the information about the first terminal, a first AMF network element that serves the first terminal. It should be noted that the second control plane network element may alternatively be any one of a second PCF network element, the second AMF network element, a second SMF network element, and a second UDM network element. In this case, the second PCF network element/the second AMF network element/the second SMF network element/the second UDM network element may determine, based on the information about the first terminal, any one of the first AMF network element, a first SMF network element, a first UDM network element, and a first PCF network element that are connected to the first terminal.

In other words, in addition to determining the first SMF network element, the second SMF network element may further determine any one of the first AMF network element, the first PCF network element, and the first UDM network element.

It should be understood that in this embodiment of this application, the second control plane network element sends the session management trigger message to the first control plane network element determined based on the information about the first terminal.

In an optional embodiment, the method provided in this embodiment of this application further includes: after determining target QoS parameter information of the first session in the first network, controlling, by the first control plane network element, the first terminal to transmit the user plane data of the second terminal to the second network by using a data transmission channel between the first network and the second network.

It should be understood that, for the architecture shown in FIG. 2, after determining the target QoS parameter information of the first session in the first network, the first control plane network element controls the first terminal to transmit the user plane data of the second terminal to the second network by using the data transmission channel between the first network and the second network. In this case, the user plane data transmitted to the second network is user plane data sent by the second terminal to the second network. A specific process may be as follows: The first terminal receives the user plane data from the second terminal, and transmits the user plane data to a UPF network element in the first network by using a data transmission channel in the first network. Then, the UPF network element transmits the user plane data of the second terminal to the second network by using the data transmission channel between the first network and the second network. For example, the data transmission channel in the first network may be the first session.

For the architecture shown in FIG. 3, after the first control plane network element determines the target QoS parameter information of the first session in the first network, the first control plane network element controls the second terminal to transmit the user plane data to the second network by using the data transmission channel between the first network and the second network. In this case, the user plane data transmitted to the second network is the user plane data sent by the second terminal to the second network. The second terminal transmits the user plane data to a UPF network element in the first network by using a data transmission channel in the first network. Then, the UPF network element transmits the user plane data of the second terminal to the second network by using the data transmission channel between the first network and the second network. For example, the data transmission channel in the first network may be the first session.

Specifically, the first control plane network element controls, by using the data transmission channel in the first network, the first terminal to transmit the user plane data of the second terminal to the second network based on the determined target QoS parameter information.

For example, before determining the target QoS parameter information, the first network transmits the user plane data of the second terminal by using a QoS parameter 1. If the determined target QoS parameter information is a QoS parameter 2, the first control plane network element controls the first terminal to transmit the user plane data of the second terminal to the second network by using the data transmission channel between the first network and the second network and by using the QoS parameter 2.

For example, the target QoS parameter information may be a second QoS parameter, or may be a QoS parameter that is prestored in the first control plane network element and that is used to transmit the user plane data of the second terminal. Alternatively, the target QoS parameter information may be QoS parameter information from the second control plane network element. This is not limited in this embodiment of this application.

It should be noted that after the first control plane network element determines the target QoS parameter information of the first session in the first network, if the first control plane network element receives downlink user plane data sent by the second network to the second terminal, the first control plane network element may alternatively send the downlink user plane data to the second terminal by using the data transmission channel in the first network.

For example, that the first control plane network element manages the first session in this embodiment of this application includes: modifying, by the first control plane network element, the first session, or deleting, by the first control plane network element, the first session, or establishing, by the first control plane network element, the first session.

Figure 8:
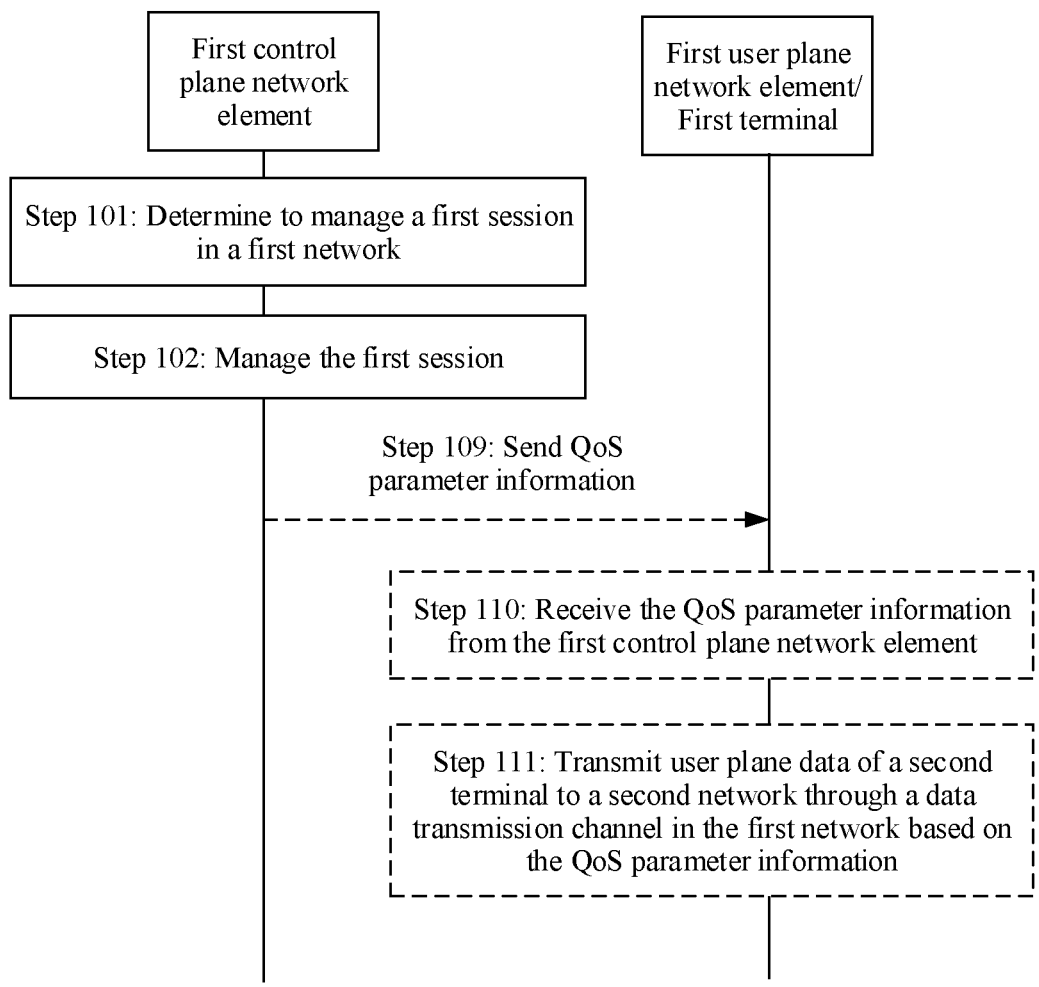
FIG. 8 is a schematic flowchart of a session management method according to an embodiment of this application.

In an optional embodiment, as shown in FIG. 8, the method provided in this embodiment of this application further includes step 109, step 110, and step 111.

Step 109: The first control plane network element sends QoS parameter information to a first user plane network element in the first network and/or the first terminal in the first network, where the second terminal accesses the second network by using the first terminal.

For example, in a process in which the first control plane network element manages the first session, the first control plane network element sends the QoS parameter information to the first user plane network element in the first network and/or the first terminal in the first network.

Step 110: The first user plane network element/The first terminal in the first network receives the QoS parameter information from the first control plane network element in the first network.

Step 111: The first user plane network element and/or the first terminal transmit/transmits the user plane data of the second terminal to the second network by using the data transmission channel between the first network and the second network based on the QoS parameter information.

For specific content of the QoS parameter information in step 109 to step 111, refer to the description in the foregoing embodiment. Details are not described herein again.

For example, when a user plane performs transmission, for uplink user plane data (that is, the user plane data sent by the second terminal to the second network), the first terminal determines target uplink user plane data. A service descriptor carried in the target uplink user plane data and the service descriptor determined by using the QoS parameter information are the same, or have a mapping relationship with each other. Alternatively, a QoS flow ID, for example, a QFI or a 5QI, carried in the target uplink user plane data meets a preset requirement. The first terminal transmits the target uplink user plane data to the second network by using the QoS resource determined by using the QoS indication. For the downlink user plane data (namely, the user plane data sent by the second network to the second terminal), the first user plane network element determines target downlink user plane data. A service descriptor carried in the target downlink user plane data and the service descriptor determined by using the QoS parameter information are the same, or have a mapping relationship with each other. The first user plane network element transmits the target downlink user plane data to the second terminal by using the corresponding QoS resource determined by using QoS. Alternatively, a QoS flow ID, for example, a QFI or a 5QI, carried in the target downlink user plane data meets a preset requirement.

It should be noted that the service descriptor is an optional parameter. To be specific, if the second control plane network element has not sent the QoS parameter information to the first control plane network element, the first user plane network element uses the QoS flow ID carried in the downlink user plane data, for example, the QFI or the 5QI, to determine the target downlink user plane data, and transmits the target downlink user plane data by using the QoS resource determined by using the QoS indication. The first terminal uses the QoS flow ID carried in the uplink user plane data, for example, the QFI or the 5QI, to determine the target uplink user plane data, and transmits the target uplink user plane data by using the QoS resource determined by the QoS indication.

It should be noted that if the first control plane network element determines to transmit the user plane data in the first network by using the target QoS parameter information, the QoS parameter information in step 109 and step 111 may be replaced with the target QoS parameter information.

Figure 9:
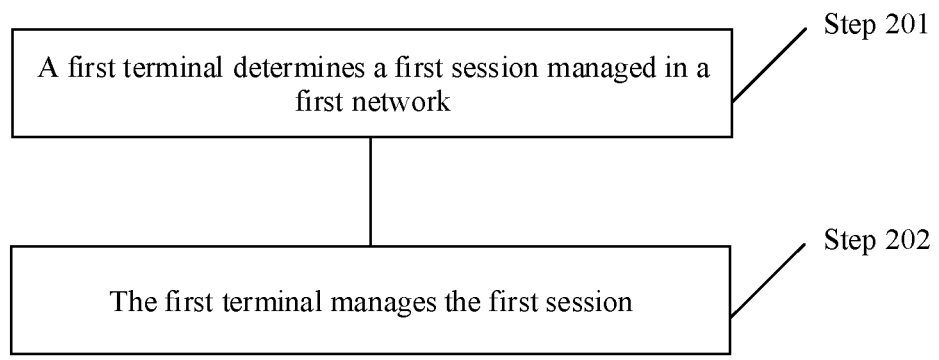
FIG. 9 is a schematic flowchart of a session management method according to an embodiment of this application.

FIG. 9 shows another embodiment of this application. A difference between FIG. 9 and the foregoing embodiment lies in that in FIG. 9, a second terminal triggers a first terminal to manage a first session.

Step 201: A first terminal determines the first session managed in a first network.

The first network includes network elements on a network with which the first terminal registers. For example, for the network architecture shown in FIG. 2, that the first terminal is the terminal 202 is used as an example, and the first session is a session that serves the second terminal (for example, the terminal 10 in FIG. 2) and that is in the first network. It should be understood that the second terminal accesses a second network by using the first terminal. The terminal 10 has the first session in the first network, and has a second session in the second network. In this case, the first terminal belongs to the first network, and the first terminal may be an RG. In the network architecture shown in FIG. 2, for specific content of the first network, refer to the description in step 101.

For example, for the network architecture shown in FIG. 3, that the first terminal is the terminal 10 is used as an example, and the first session is a session that serves the terminal 10 and that is in the first network. It should be understood that the terminal 10 has the first session in the first network, and has a second session in a second network. In this case, the first terminal may be a mobile phone or the like. In the network architecture shown in FIG. 3, for specific content of the first network, refer to the description in step 101.

Step 202: The first terminal manages the first session.

For example, that the first terminal manages the first session includes: initiating, by the first terminal, a first session delete procedure, initiating a first session modification procedure, and initiating a first session establishment procedure.

Figure 10:
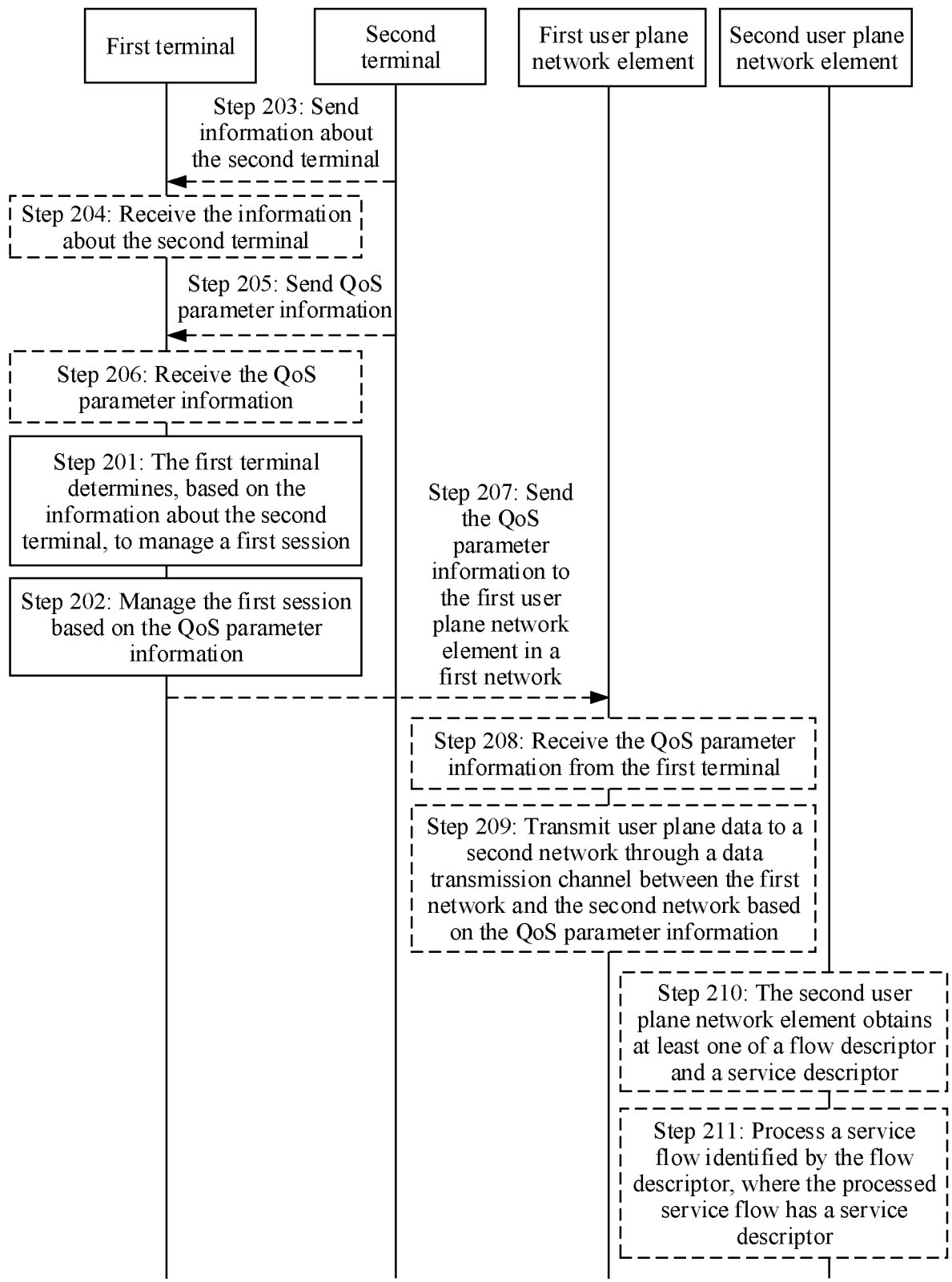
FIG. 10 is a schematic flowchart of a session management method according to an embodiment of this application.

In a first possible embodiment, if the method shown in FIG. 9 is applicable to the network architecture shown in FIG. 2, the first terminal in step 201 is the terminal 202 in the first network 20. In an optional implementation, as shown in FIG. 10, the method provided in this embodiment of this application further includes the following steps.

Step 203: The second terminal sends information about the second terminal and/or information about the first terminal to the first terminal. The information about the second terminal is for determining the first session. The information about the first terminal is for determining the first session. It should be understood that the second terminal in step 203 may be the terminal 10 in FIG. 2, and the first terminal may be the terminal 202 in FIG. 2.

For the information about the second terminal and the information about the first terminal, refer to the descriptions in the foregoing embodiment. Details are not described herein again.

In a possible implementation, step 203 in this embodiment of this application may be implemented in the following manner: After or when the second control plane network element in the second network performs a second session management procedure, the second terminal sends the information about the second terminal and/or the information about the first terminal to the first terminal.

Step 204: The first terminal receives the information about the second terminal and/or the information about the first terminal from the second terminal.

For example, the first terminal may receive the information about the second terminal from the second terminal by using an HTTP message, a dynamic host configuration protocol (DHCP) message, or the like.

Correspondingly, step 201 may be specifically implemented in the following manner: The first terminal determines, based on the information about the second terminal and/or the information about the first terminal, to manage the first session.

For a specific implementation of step 201 herein, refer to a specific implementation in which a first control plane network element determines, based on the information about the second terminal, to manage the first session in a second optional implementation of the foregoing embodiment. It should be noted that when the first terminal determines to manage the first session, the first control plane network element in the second optional implementation may be replaced with the first terminal. Details are not described herein again.

For example, that the first terminal manages the first session in this embodiment of this application includes: deleting, by the first terminal, the first session, modifying, by the first terminal, the first session, or establishing, by the first terminal, the first session. This is not limited in this embodiment of this application.

In an optional implementation, as shown in FIG. 10, the method provided in this embodiment of this application further includes the following steps.

Step 205: The second terminal sends QoS parameter information to the first terminal. The QoS parameter information is for determining a QoS requirement for transmitting user plane data of the second terminal in the first network.

It should be understood that the QoS parameter information in this embodiment of this application is for determining the QoS requirement for transmitting user plane data of the second terminal in the first network.

Step 206: The first terminal receives the QoS parameter information from the second terminal.

Correspondingly, step 202 may be specifically implemented in the following manner: The first terminal manages the first session based on the QoS parameter information.

For example, for a specific implementation of step 202, refer to a process in which the first control plane network element manages the first session based on the QoS parameter information. It should be noted that when the first terminal manages the first session, only the first control plane network element in the process in which the first control plane network element manages the first session based on the QoS parameter information needs to be replaced with the first terminal. Details are not described herein again.

For specific content of the QoS parameter information in step 205 and step 206 in this embodiment of this application, refer to the description in the foregoing embodiment. Details are not described herein again.

It may be understood that, after the first terminal manages the first session, user plane data of the second terminal that is transmitted in the first session may meet the QoS requirement.

It should be noted that the QoS parameter information and the information about the second terminal may be sent by the second terminal to the first terminal by using a same message (for example, a first message). Certainly, the QoS parameter information and the information about the second terminal may be separately carried in different messages, and sent by the second terminal to the first terminal.

For example, the first message may be a hypertext transfer protocol (HTTP) message.

It should be understood that, after the second terminal establishes an HTTP connection to the first terminal, the second terminal may send the HTTP message to the first terminal, where the HTTP message carries the QoS parameter information and the information about the second terminal.

In a second embodiment, if the method shown in FIG. 9 is applicable to the network architecture shown in FIG. 3, the first terminal in step 201 is the terminal 202 in the first network 20. In an optional implementation, step 201 in this embodiment of this application may be implemented in the following manner: After managing the second session in the second network, the first terminal determines that the first session in the first network needs to be managed.

It should be understood that, for the network architecture shown in FIG. 3, step 202 may be specifically implemented in the following manner: The first terminal performs a first session management process based on the QoS parameter in a second session management process.

For example, if the first terminal uses a QoS parameter 1 when managing the second session in the second network, the first terminal also uses the QoS parameter 1 when managing the first session in the first network.

In an optional implementation, as shown in FIG. 10, regardless of the network architecture shown in FIG. 2 or FIG. 3, the method provided in this embodiment of this application further includes the following steps.

Step 207: In the process in which the first terminal manages the first session, the first terminal sends the QoS parameter information to a first user plane network element in the first network, where the QoS parameter information indicates to transmit user plane data based on the QoS parameter information.

It should be understood that, for the architecture shown in FIG. 3, the first terminal in step 207 is the second terminal 10.

Step 208: The first user plane network element receives the QoS parameter information from the first terminal.

It should be understood that the first user plane network element may receive the QoS parameter information from the first terminal in the process in which the first terminal manages the first session.

Step 209: The first user plane network element transmits the user plane data to the second network by using a data transmission channel between the first network and the second network based on the QoS parameter information.

Specifically, for a specific implementation of step 209, refer to the specific implementation described in step 111. For the QoS parameter information, refer to the description in the foregoing embodiment. Details are not described herein again.

It should be noted that the user plane data in step 209 is user plane data from the second terminal in the structure shown in FIG. 2. The user plane data in step 209 is user plane data from the first terminal in the structure shown in FIG. 3.

In an optional implementation, the method provided in this embodiment of this application further includes: transmitting, by the first terminal, user plane data to a second network by using a data transmission channel in the first network.

Specifically, the first terminal sends the user plane data to the first user plane network element by using the data transmission channel in the first network, and the first user plane network element transmits the user plane data to the second network.

In another optional implementation, as shown in FIG. 9, in the second session management process in this embodiment of this application, the method provided in this embodiment of this application further includes the following steps.

Step 210: In the second session management process, a second user plane network element in the second network obtains at least one of a flow descriptor and a service descriptor, where the second session is used to provide a connection in the second network for the second terminal.

The second terminal accesses the second network by using the first network.

It should be noted that the second session management process may be performed by the second terminal in the second network, or may be performed by the first terminal in the second network. This is not limited in this embodiment of this application.

Step 211: The second user plane network element processes a service flow identified by the flow descriptor, where the processed service flow has a service descriptor.

The second user plane network element in step 210 and step 211 may be the UPF network element 302, the IWF network element 303, or the terminal 10 shown in FIG. 2 or FIG. 3.

For example, the service descriptor such as a DSCP or an SPI is added, based on QoS information corresponding to the service flow, to the flow identified by the flow descriptor.

The following describes a session management method in the embodiments of this application with reference to specific embodiments described in FIG. 13 to FIG. 16A, FIG. 16B, and FIG. 16C.

Figure 11A:
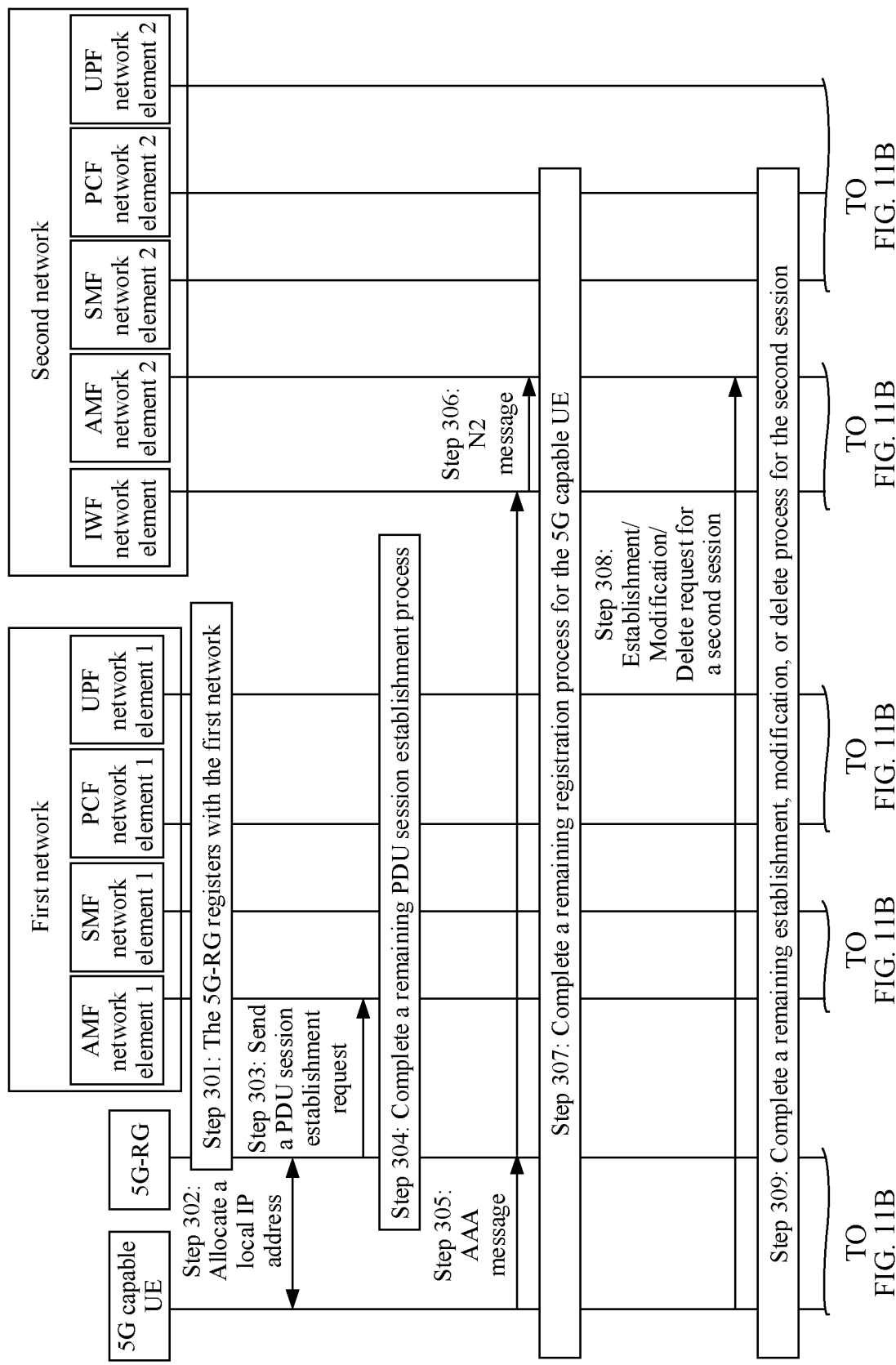
Figure 11B:
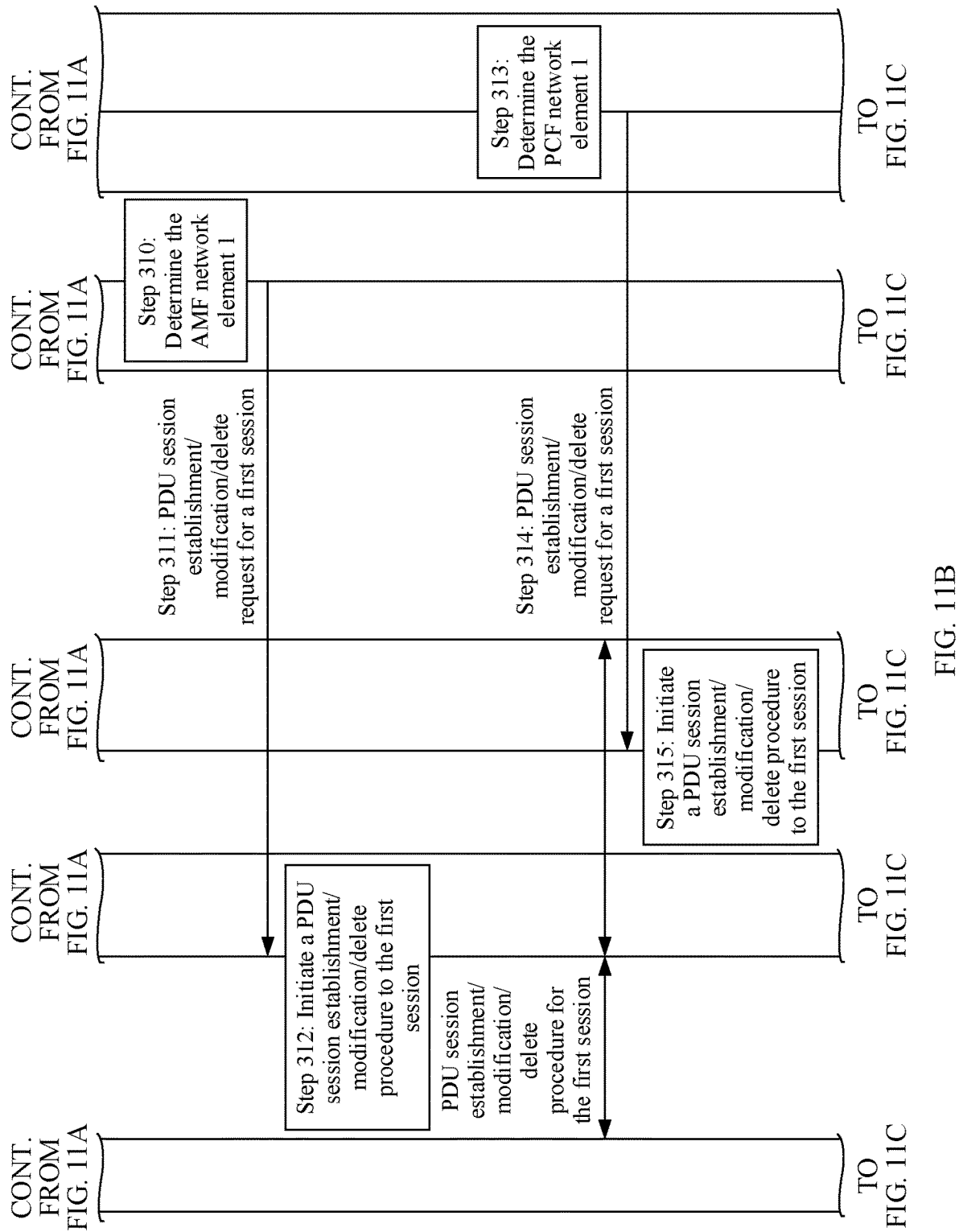

As shown in FIG. 11A, FIG. 11B, and FIG. 11C, that update of QoS of a first session in a first network is triggered by a second network, a first terminal is a 5G-RG, and a second terminal is 5G capable UE is used as an example. The session management method includes the following steps.

Step 301: The 5G-RG registers with the first network.

For example, as shown in FIG. 2, the first network may include a first AMF network element, a first SMF network element, a first PCF network element, an access device 204, and a user plane function network element 203.

For a specific process in which the 5G-RG registers with the first network, refer to a description in the prior art. Details are not described herein again in this embodiment of this application.

Step 302: The 5G-RG allocates a local IP address to the 5G capable UE.

The 5G capable UE establishes a connection to an IWF network element by using the local IP address.

Step 303: The 5G-RG sends a PDU session establishment request to an AMF network element 1 in the first network.

The PDU session establishment request carries 5G capable UE information. The 5G capable UE information may be any information that can be used to identify the 5G capable UE or a PDU session of the 5G capable UE. Specifically, for specific content of the 5G capable UE information, refer to the information about the second terminal in the foregoing embodiment. Details are not described herein again.

It should be understood that the 5G capable UE information may be preconfigured in the 5G-RG, or may be sent by the 5G capable UE to the 5G-RG. This is not limited in this embodiment of this application.

Step 304: The 5G-RG completes a remaining PDU session establishment process.

It should be understood that after step 304, the 5G-RG completes establishment of a session connection to the first network.

It should be noted that step 302 may alternatively be performed after step 304. This is not limited in this embodiment of this application.

Step 305: In a procedure in which the 5G capable UE registers with the second network, the 5G capable UE sends an AAA message to the IWF network element by using the 5G-RG, so that the IWF network element receives the AAA message.

In this embodiment of this application, for a process in which the 5G capable UE registers with the second network by using the first network, refer to a description in the prior art. Details are not described in this embodiment of this application again.

The AAA message carries 5G-RG information. The 5G-RG information may be any information that can be used to identify the 5G-RG or the PDU session of the 5G-RG. For specific content of the 5G-RG information, refer to the description of the information about the first terminal. Details are not described herein again.

It should be noted that, in the procedure in which the 5G capable UE registers with the second network, if the AAA message sent by the 5G capable UE to the IWF network element does not carry the 5G-RG information, the 5G-RG may insert the 5G-RG information into the AAA message when receiving the AAA message, and send the AAA message carrying the 5G-RG information to the IWF network element. If the AAA message sent by the 5G capable UE to the IWF network element carries the 5G-RG information in the procedure in which the 5G capable UE registers with the second network, the 5G-RG may directly forward the AAA message when receiving the AAA message.

Step 306: The IWF network element sends an N2 message to an AMF network element 2 in the second network.

The N2 message carries 5G-RG information.

Step 307: The 5G capable UE completes a remaining registration process for the 5G capable UE. After this process, the 5G capable UE completes a registration process in the second network.

Step 308: The 5G capable UE sends an establishment/modification/delete request for a second session to the AMF network element 2.

The PDU session establishment/modification/delete request carries the 5G capable UE information.

Step 309: The 5G capable UE completes a remaining establishment, modification, or delete process for the second session.

In this process, the 5G capable UE, the IWF network element, and a UPF network element 2 in the second network are notified of a flow descriptor and a service descriptor. A service descriptor such as a DSCP or an SPI should be added, based on QoS information corresponding to the service flow, to a flow identified by the flow descriptor.

After step 304, the 5G-RG completes a process of establishing, modifying, or deleting the session connection to the first network. It should be understood that, if a modification or delete procedure is performed, an establishment procedure is first performed.

Step 310: The AMF network element 2 determines, based on the 5G-RG information, the AMF network element 1 connected to the 5G-RG in the first network.

It should be understood that that the AMF network element 2 determines the AMF network element 1 is used as an example herein. Certainly, the AMF network element 2 may alternatively determine an SMF network element 1, a PCF network element 1, and the like in the first network.

Step 311: The AMF network element 2 sends a PDU session establishment/modification/delete request for the first session to the AMF network element 1.

The PDU session establishment/modification/delete request for the first session carries at least one of QoS parameter information and the 5G capable UE information.

Specifically, for the QoS parameter information, refer to the specific description in the foregoing embodiment. Details are not described herein again.

Step 312: The AMF network element 1 initiates, based on the PDU session establishment/modification/deletion request for the first session, a PDU session establishment/modification/deletion procedure to the first session corresponding to the 5G capable UE information, to meet a QoS requirement determined by using the QoS parameter information.

As shown in FIG. 11A, FIG. 11B, and FIG. 11C, step 310 to step 312 may alternatively be replaced with the following step 313 to step 315.

Step 313: A PCF network element 2 in the second network determines, based on the 5G-RG information, a PCF network element 1 connected to the 5G-RG in the first network.

It should be understood that in a process in which the PCF network element 2 determines the PCF network element 1, the AMF network element 2 may send the 5G-RG information to the PCF network element 2.

It should be understood that that the PCF network element 2 determines the PCF network element 1 is used as an example herein. Certainly, the PCF network element 2 may further determine an SMF network element 1, the PCF network element 1, or the AMF network element 1.

Step 314: The PCF network element 2 sends a PDU session establishment/modification/delete request for the first session to the PCF network element 1.

Specifically, the PDU session establishment/modification/delete request for the first session in step 314 carries at least one of QoS parameter information or the 5G capable UE information.

Specifically, for the QoS parameter information, refer to the specific description in the foregoing embodiment. Details are not described herein again.

Step 315: The PCF network element 1 initiates, based on the PDU session establishment/modification/delete request for the first session, a PDU session establishment/modification/delete procedure to the first session corresponding to the 5G capable UE information, to meet a QoS requirement determined by using the QoS parameter information.

In an optional embodiment, after step 310 or step 315, the method provided in this embodiment of this application further includes:

Step 316: The 5G-RG receives uplink user plane data from the second terminal.

Step 317: The 5G-RG identifies a service descriptor in the uplink user plane data of the second terminal, and transmits, to a UPF network element 1 by using a QoS resource determined by using a QoS indication, uplink user plane data whose service descriptor is consistent with a service descriptor determined by using the QoS parameter information.

It should be understood that after receiving the uplink user plane data from the 5G-RG, the UPF network element 1 transmits the uplink user plane data from the 5G-RG to the UPF network element 2.

Step 318: The UPF network element 1 identifies downlink user plane data received from the UPF network element 2 in the second network. The UPF network element 1 transmits the downlink user plane data to the 5G capable UE.

In this embodiment of this application, in a process in which an AMF network element determines to manage the second session, the AMF network element 1 in the first network is triggered to manage the first session. In this way, collaboration between QoS of the first session in the first network and QoS of the second session in the second network can be implemented.

Figure 12:
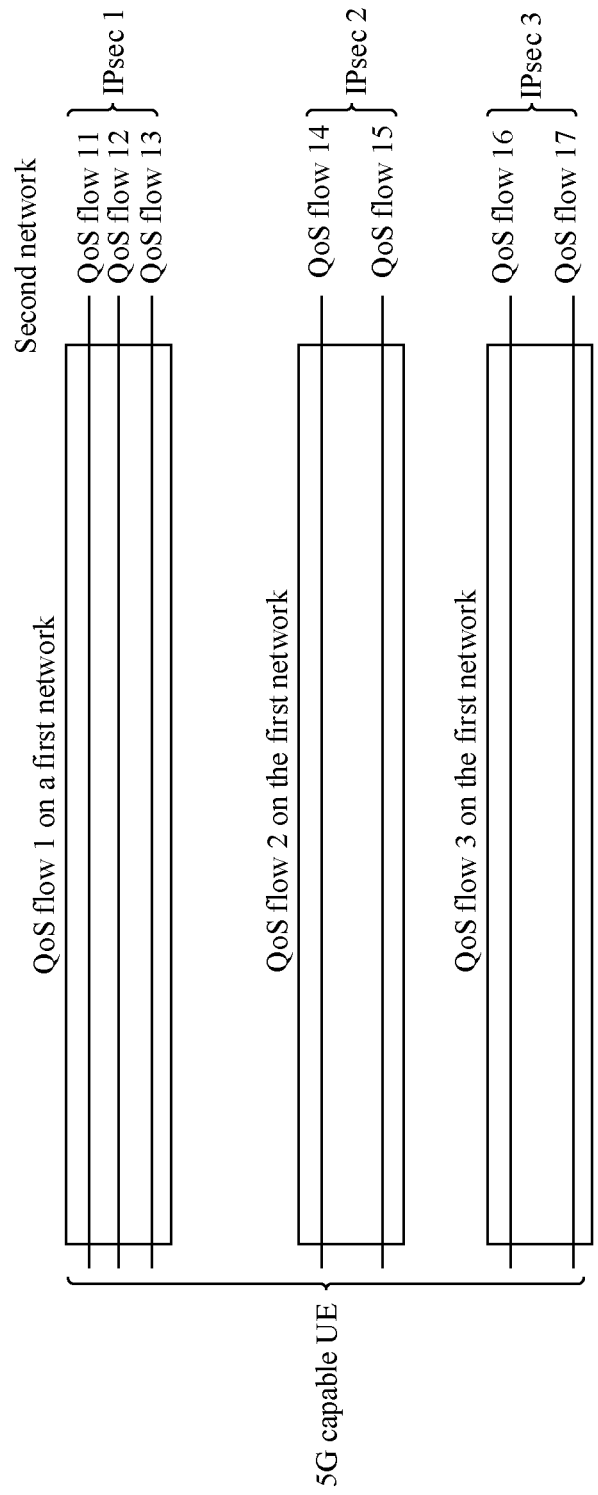
FIG. 12 is a schematic diagram of a relationship between IPsec tunnels and quality of service flows according to an embodiment of this application.

For example, user plane data transmitted through each IPsec tunnel established between the 5G capable UE and the second network is transmitted by using a QoS flow in the first network. As shown in FIG. 12, the 5G capable UE has QoS flows 11 to 17, that is, seven QoS flow services (the QoS flow is an aggregation of services having same QoS). The QoS flow 11, the QoS flow 12, and the QoS flow 13 are transmitted by using IPsec 1. The QoS flow 14 and the QoS flow 15 are transmitted by using IPsec 2. The QoS flow 16 and the QoS flow 17 are transmitted by using IPsec 3. It is assumed that user plane data transmitted in each of IPsec 1 to IPsec 3 is transmitted by using one QoS flow in the first network. For example, IPsec 1 is transmitted by using a QoS flow 1 in the first network. IPsec 2 is transmitted by using a QoS flow 2 in the first network. IPsec 3 is transmitted by using a QoS flow 3 in the first network.

Figure 13:
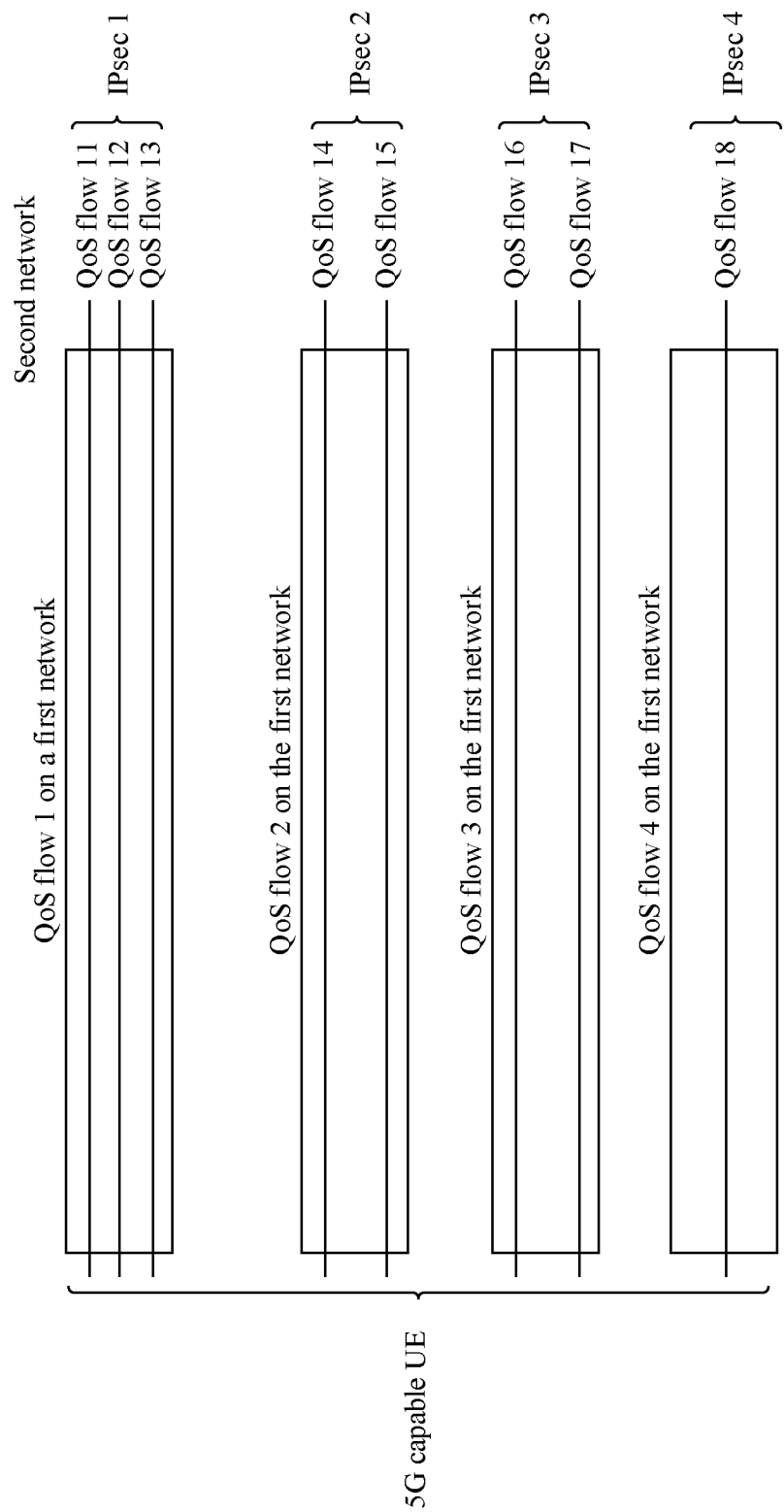
FIG. 13 is a schematic diagram of a relationship between IPsec tunnels and quality of service flows according to an embodiment of this application.

After the 5G capable UE initiates PDU session modification, as shown in FIG. 13, an effect of the PDU session modification is that a QoS flow 18 is added to the second network. The QoS flow 18 is transmitted by using IPsec 4. Then the second network instructs the first network to establish a QoS flow 4, and transmits, by using the QoS flow 4, user plane data transmitted on IPsec 4.

Certainly, it may be understood that the first network may alternatively not establish the QoS flow 4, and the user plane data transmitted on the IPsec 4 is transmitted by using the QoS flow 3.

Figure 14A:
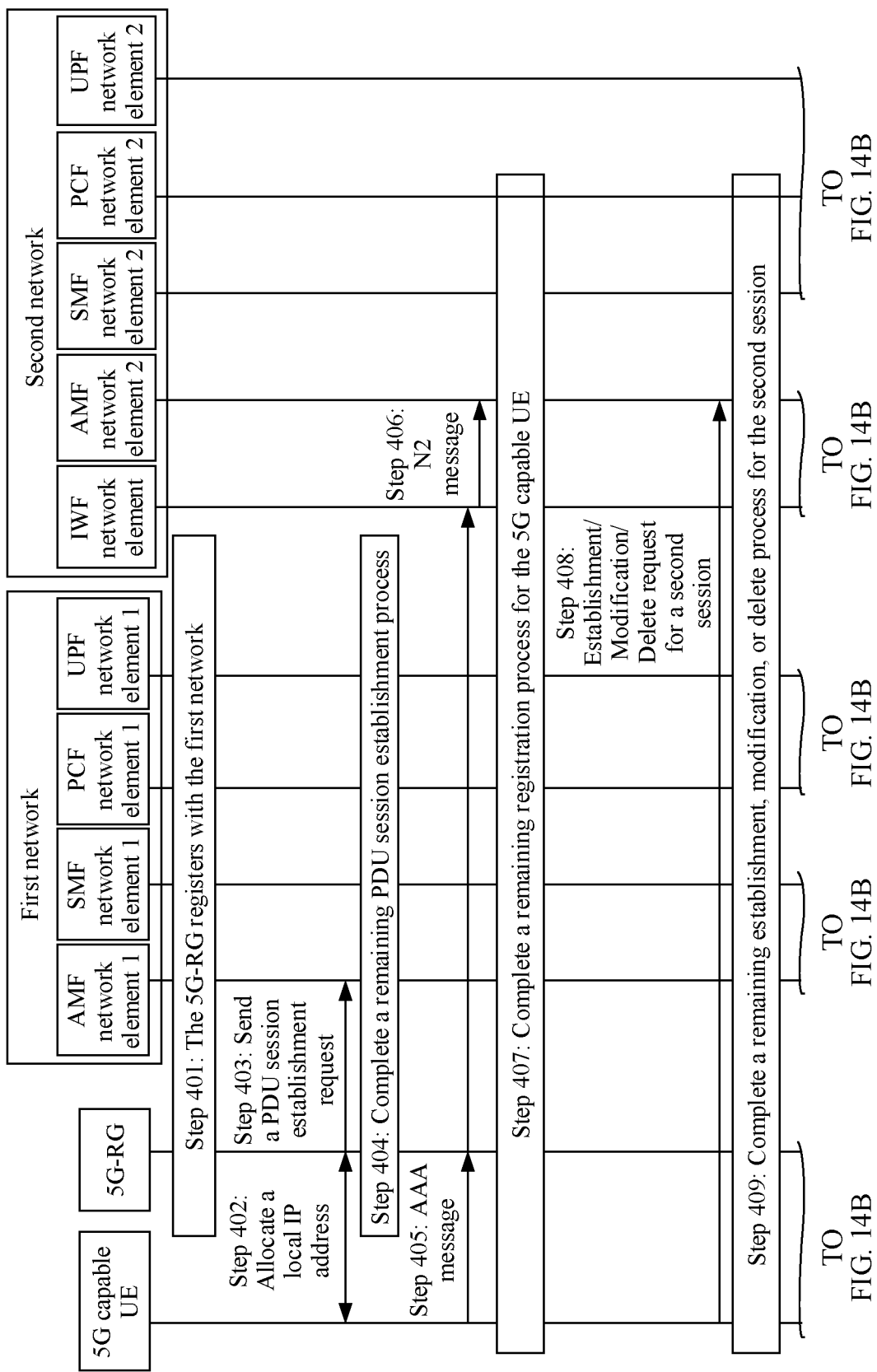
FIG. 14A, FIG. 14B, and FIG. 14C are schematic diagrams of a specific procedure of a session management method according to an embodiment of this application.
Figure 14B:
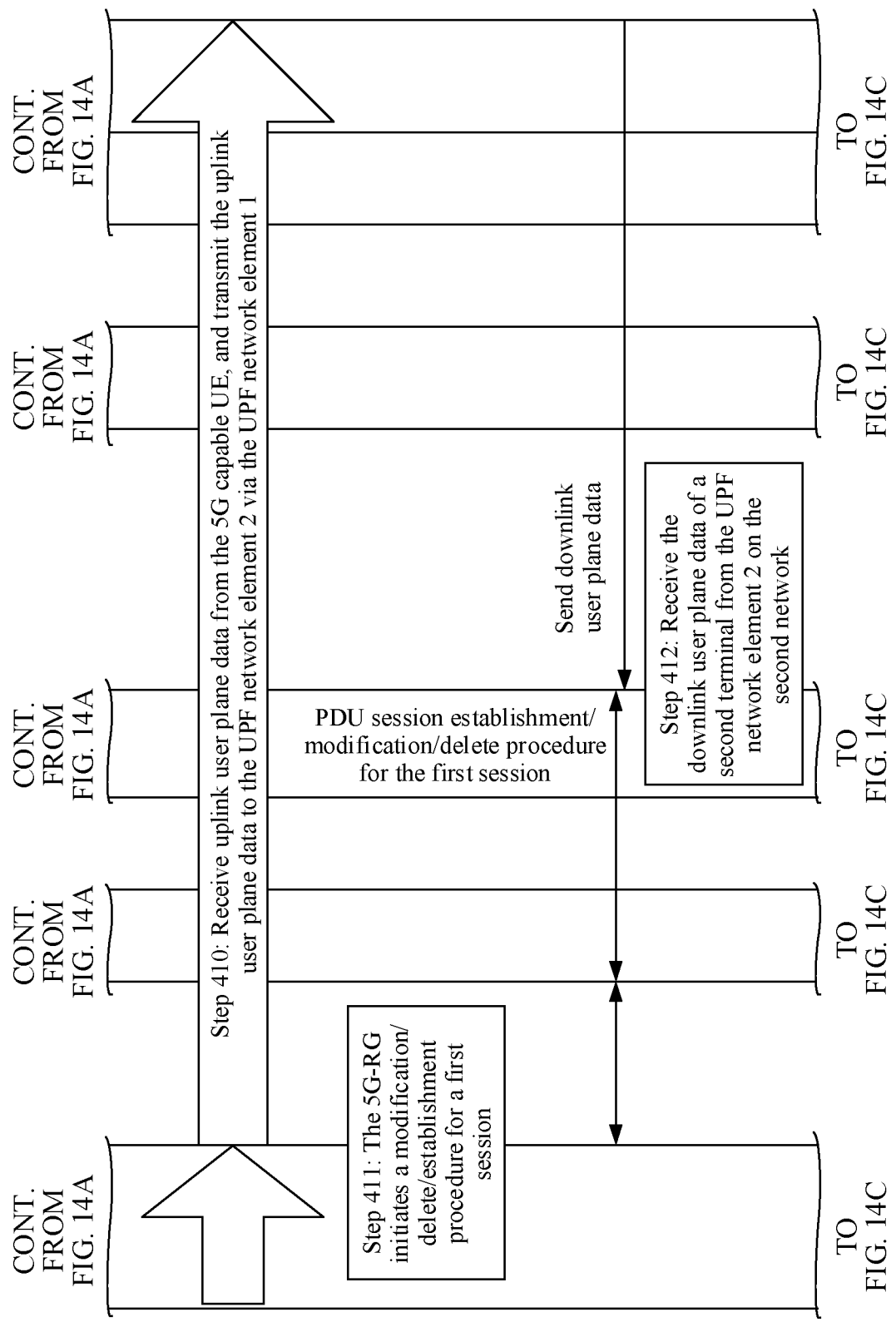
Figure 14C:
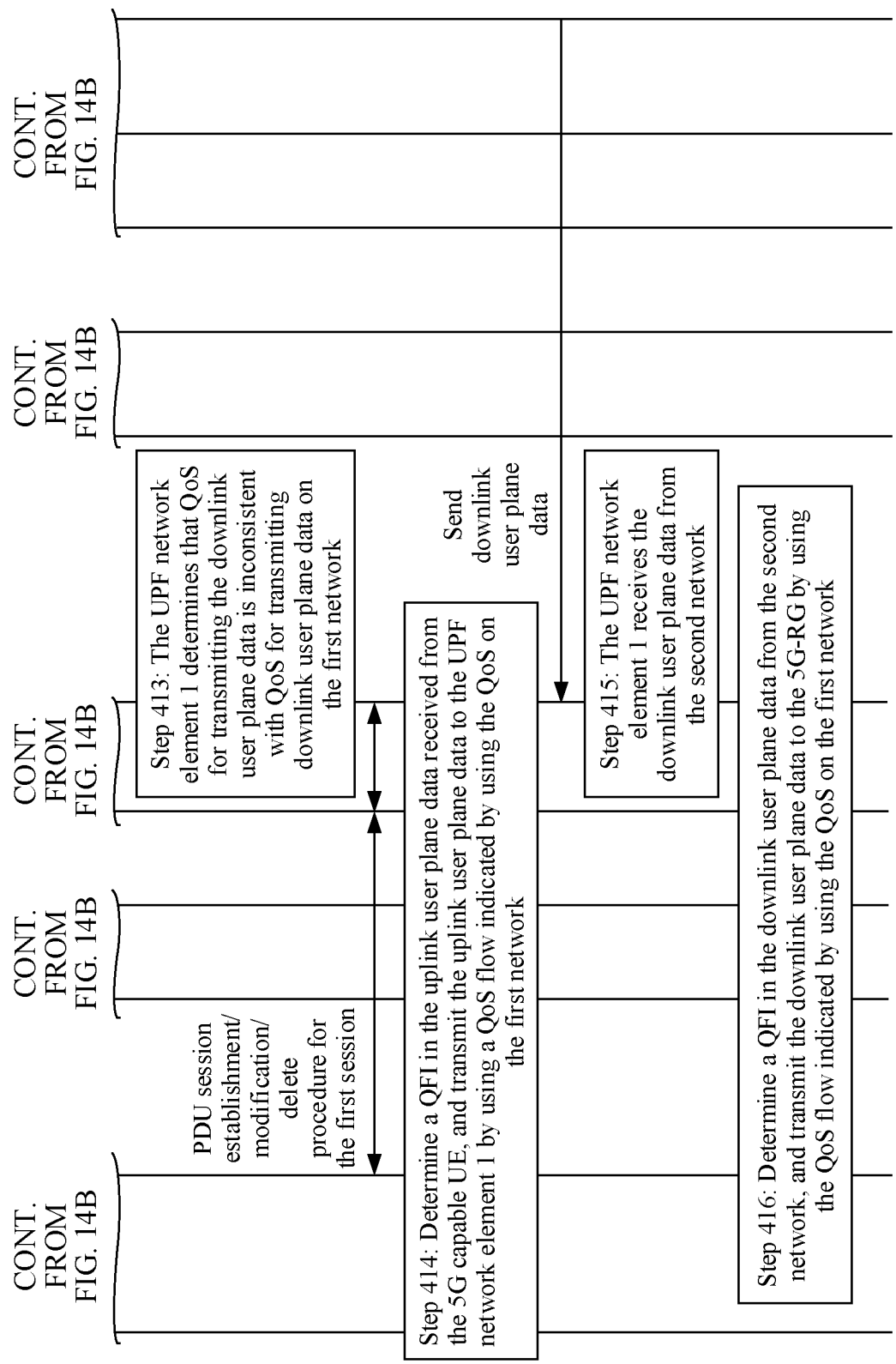

As shown in FIG. 14A, FIG. 14B, and FIG. 14C, an embodiment of this application provides another session management method. A difference between the session management method shown in FIG. 14 and the session management method shown FIG. 11A, FIG. 11B, and FIG. 11C lies in that in FIG. 14A, FIG. 14B, and FIG. 14C, a first network determines that a first session needs to be managed, and automatically updates QoS of the first session.

Step 401 to step 409 are the same as step 301 to step 309. For details, refer to step 301 to step 309. Details are not described herein again.

Step 410: A 5G-RG receives uplink user plane data from 5G capable UE, and transmits the uplink user plane data to a UPF network element 2 by using a UPF network element 1.

Step 411: The 5G-RG determines that a QoS parameter for transmitting the uplink user plane data is inconsistent with a QoS parameter for transmitting uplink user plane data in the first network, and the 5G-RG initiates a modification/delete/establishment procedure for the first session.

Specifically, step 411 may be implemented in the following manner: The 5G-RG sends a modification/delete/establishment request for the first session to an AMF network element 1, and then the AMF 1 and the UPF network element 1 complete the modification/delete/establishment procedure for the first session, so that QoS of the managed first session is consistent with QoS used to transmit uplink user plane data in a second network.

In an optional implementation, step 410 and step 411 may alternatively be replaced with step 412 and step 413.

Step 412: A UPF network element 1 receives downlink user plane data of a second terminal from a UPF network element 2 in a second network.

Step 413: The UPF network element 1 determines that QoS for transmitting the downlink user plane data is inconsistent with QoS that is for transmitting downlink user plane data and that is in the first network, and the UPF network element 1 initiates a modification/delete/establishment procedure for the first session.

Specifically, step 413 may be implemented in the following manner: The UPF network element 1 sends a modification/delete/establishment request for the first session to a PCF network element 1. Then, the PCF network element 1 and a 5G-RG complete the modification/delete/establishment procedure for the first session, so that QoS of the managed first session is consistent with QoS that is for transmitting downlink user plane data and that is in the second network.

Step 414: The 5G-RG determines a QFI in the uplink user plane data received from the 5G capable UE, and transmits the uplink user plane data to the UPF network element 1 by using a QoS flow indicated by using the QoS in the first network. The UPF network element 1 is configured to transmit the uplink user plane data to the UPF network element 2.

Specifically, if the QFI in the uplink user plane data is consistent with a QFI indicated in QoS parameter information received by the 5G-RG, the 5G-RG transmits the uplink user plane data to the UPF network element 1 by using the QoS flow indicated by using the QoS in the first network.

Step 415: The UPF network element 1 receives downlink user plane data from the second network.

Step 416: The UPF network element 1 determines a QFI in the downlink user plane data from the second network, and transmits the downlink user plane data to the 5G-RG by using the QoS flow indicated by using the QoS in the first network. The 5G-RG is configured to transmit downlink user plane data to the second terminal.

Figure 15B:
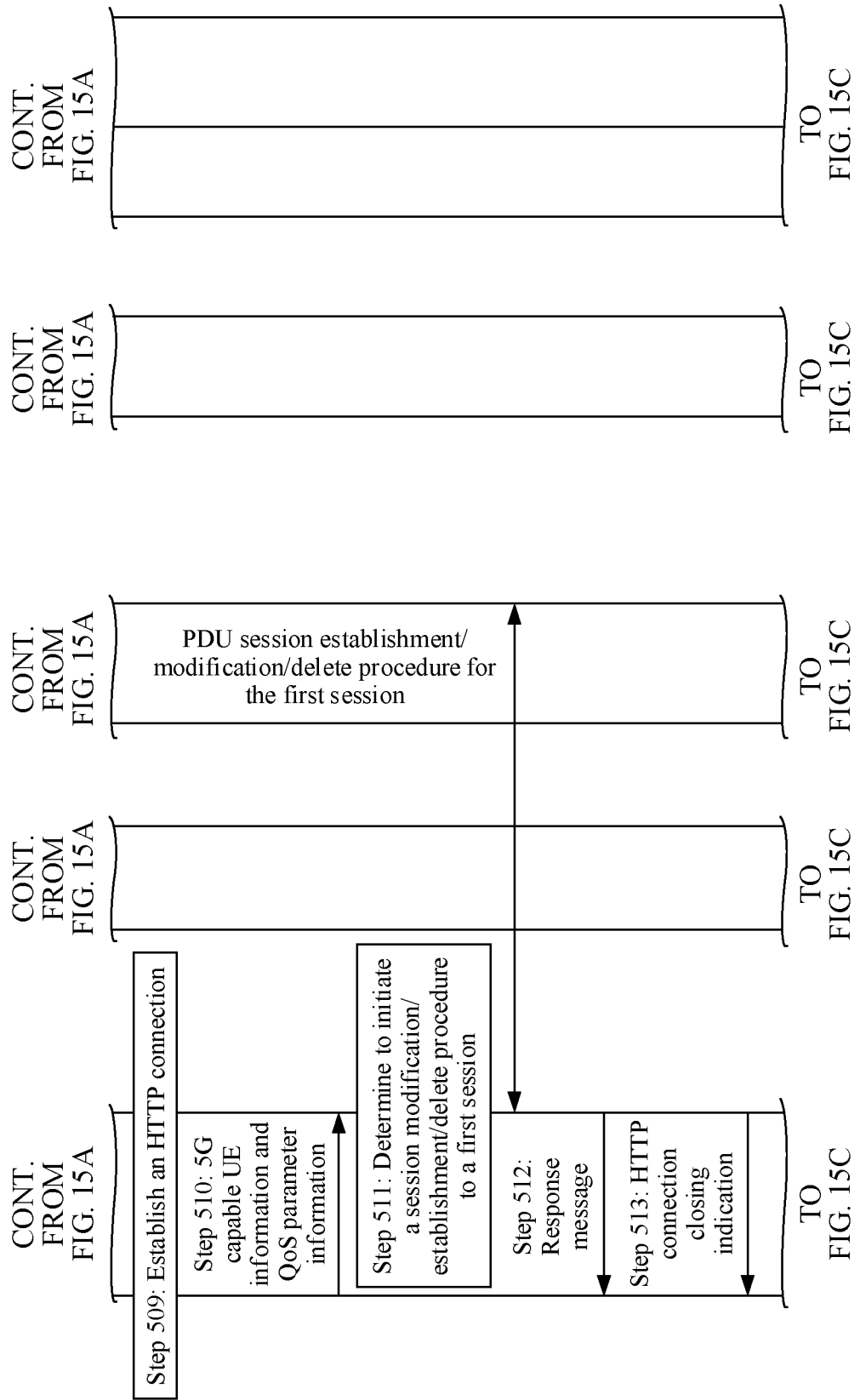
Figure 15C:
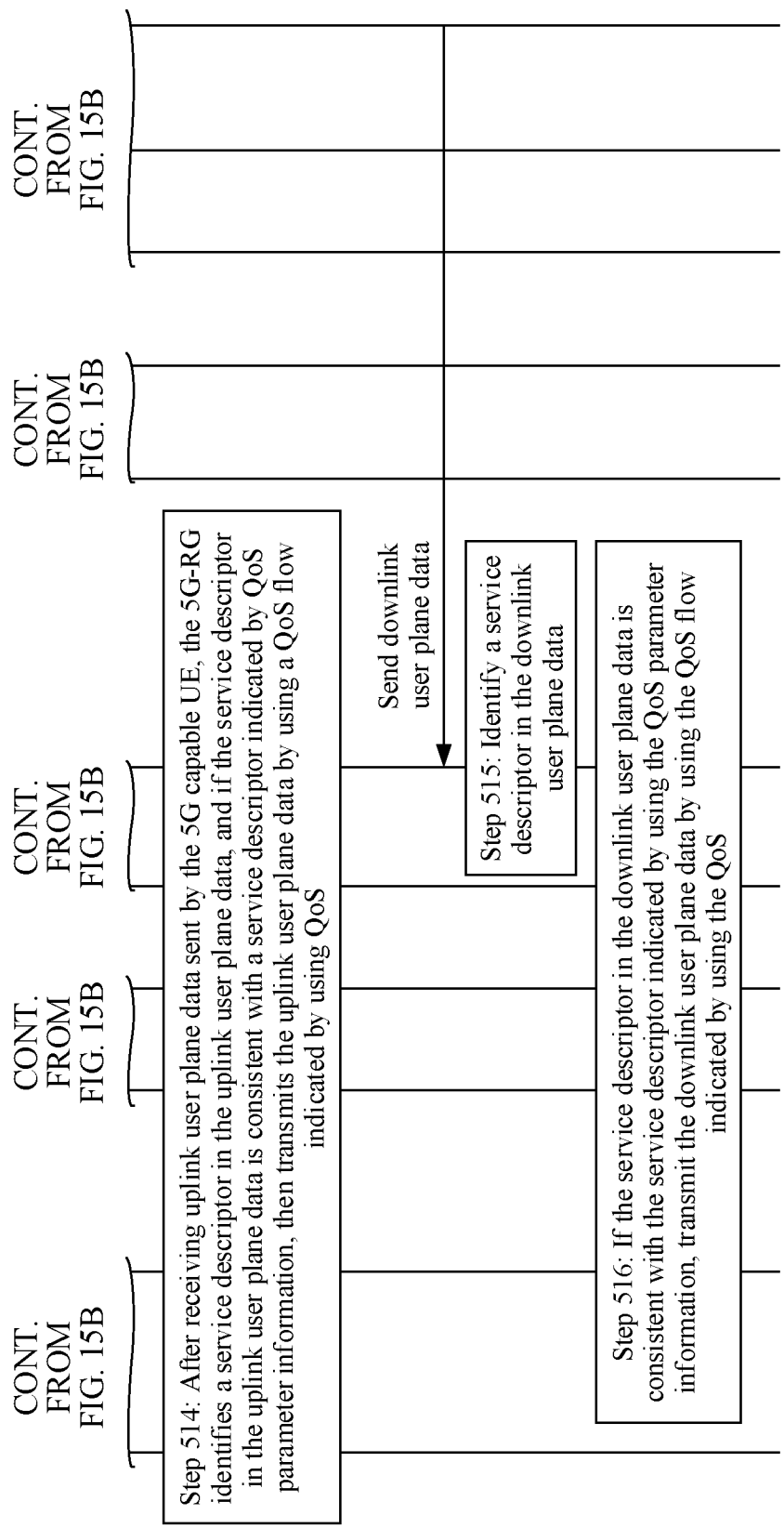

FIG. 15A, FIG. 15B, and FIG. 15C show a specific procedure of still another session management method according to an embodiment of this application. The method includes the following steps.

Step 501 to step 507 are the same as step 301 to step 307. For details, refer to the descriptions of step 301 to step 307. Details are not described herein again.

Step 508: 5G capable UE initiates a PDU session modification or establishment procedure for a second session, to send a flow descriptor and a service descriptor to an IWF network element or a UPF network element 2 in the second network.

A service descriptor such as a DSCP or an SPI should be added, based on QoS information corresponding to the service flow, to a flow identified by the flow descriptor.

Step 509: The 5G capable UE establishes an HTTP connection to a 5G-RG.

Alternatively, step 509 may be replaced in the following manner: The 5G capable UE establishes a transmission control protocol (TCP) connection to the 5G-RG.

Step 510: The 5G capable UE sends 5G capable UE information and QoS parameter information to the 5G-RG by using an HTTP message.

It should be understood that, if the TCP connection is established between the 5G capable UE and the 5G-RG, the 5G capable UE sends the 5G capable UE information and the QoS parameter information to the 5G-RG by using a TCP message.

Step 511: The 5G-RG initiates, based on the 5G capable UE information, a session modification/establishment/delete procedure to a first session determined based on the 5G capable UE information, to meet a QoS requirement determined by using the QoS parameter information.

Step 512: The 5G-RG returns a response message to the 5G capable UE.

Optionally, the response message may carry a result of the session modification/establishment/delete procedure.

Step 513: The 5G-RG sends, to the 5G capable UE, an HTTP connection disconnection indication.

Step 514: After receiving uplink user plane data sent by the 5G capable UE, the 5G-RG identifies a service descriptor in the uplink user plane data, and if the service descriptor in the uplink user plane data is consistent with a service descriptor indicated by the QoS parameter information, then transmits the uplink user plane data by using a QoS flow indicated by using QoS.

Step 515: After receiving downlink user plane data of the 5G capable UE, a UPF network element 1 in a first network identifies a service descriptor in the downlink user plane data.

Step 516: If the service descriptor in the downlink user plane data is consistent with the service descriptor indicated by using the QoS parameter information, transmit the downlink user plane data by using the QoS flow indicated by using the QoS.

Figure 16A:
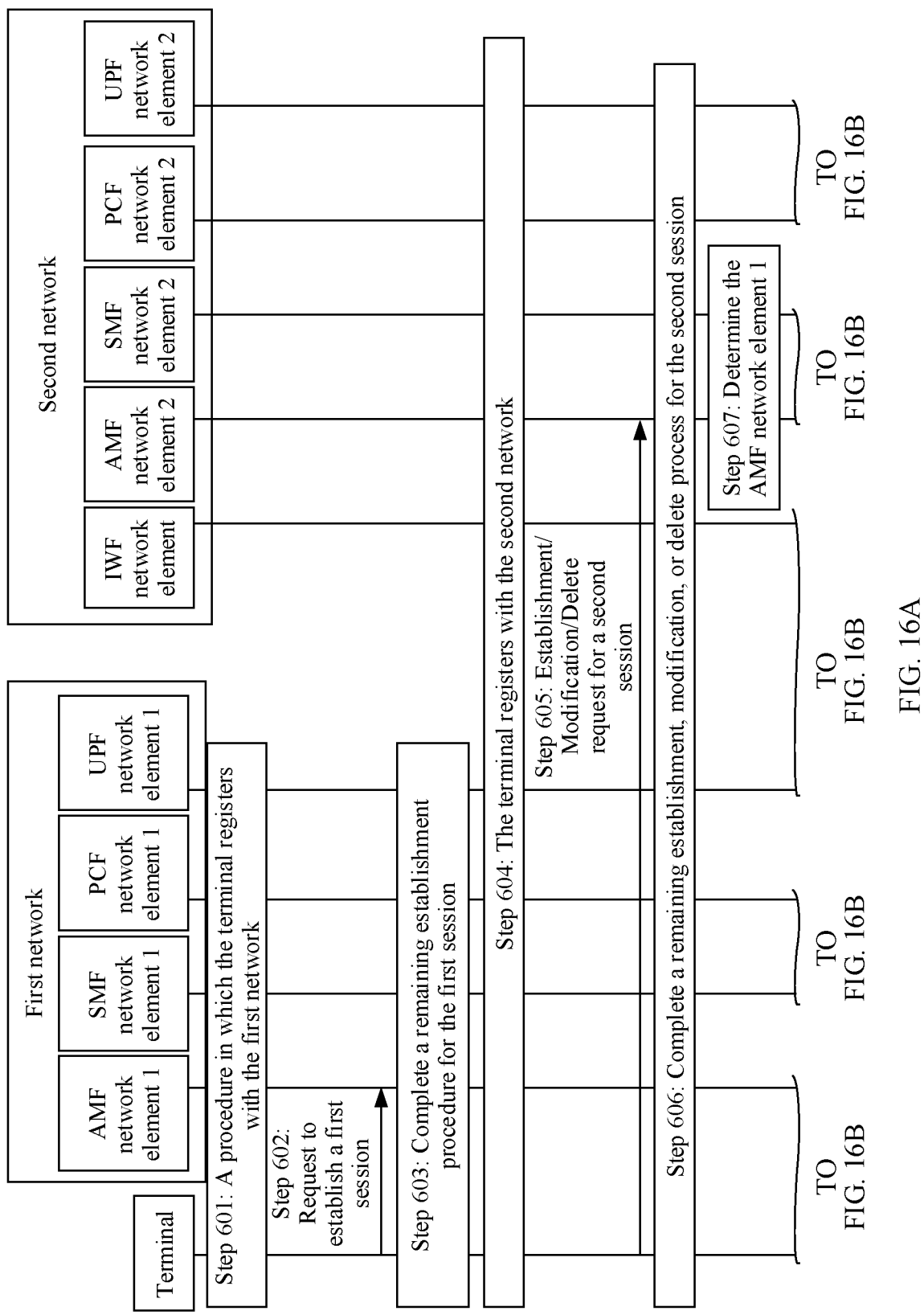
FIG. 16A, FIG. 16B, and FIG. 16C are schematic diagrams of a specific procedure of a session management method according to an embodiment of this application.
Figure 16B:
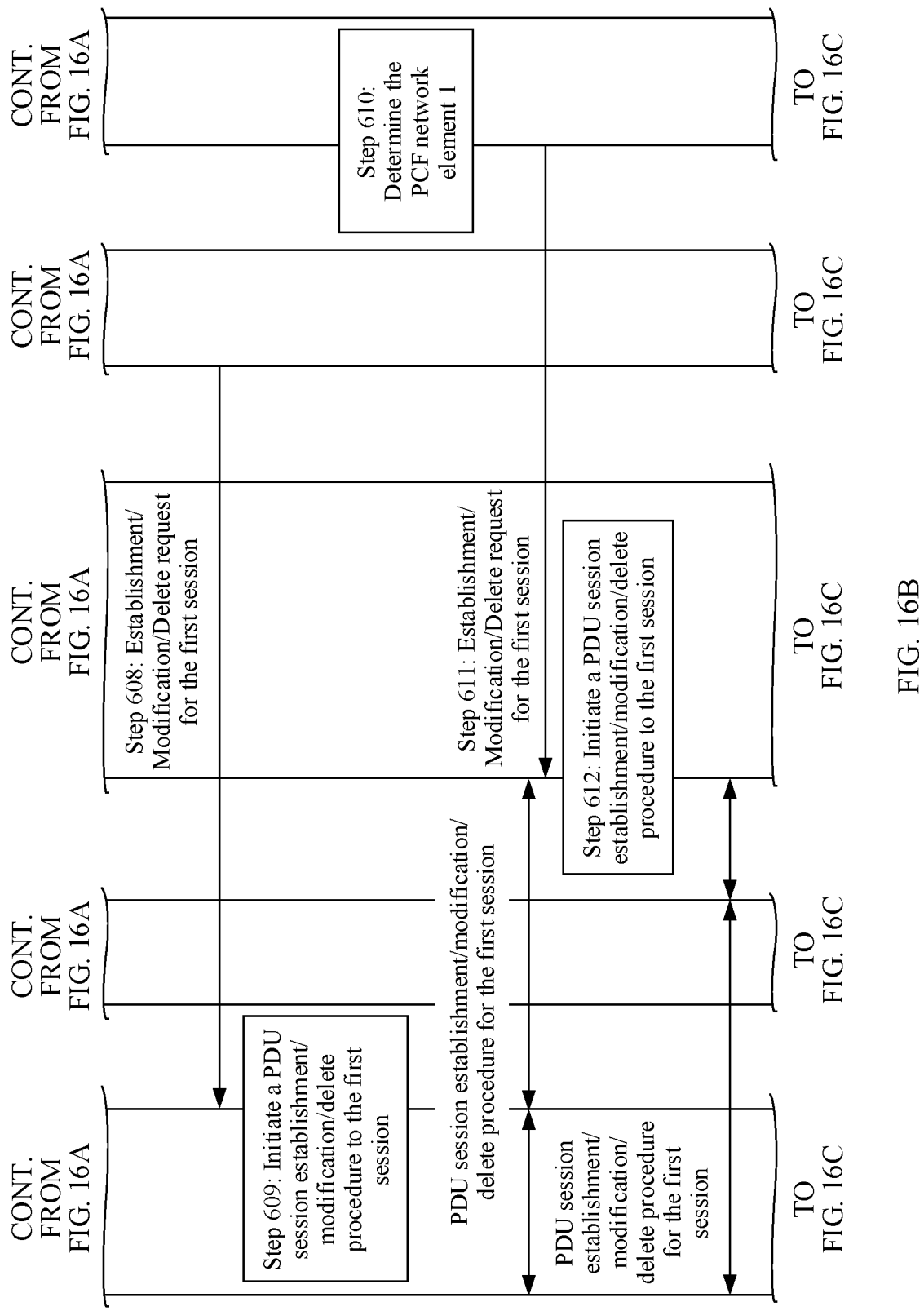
Figure 16C:
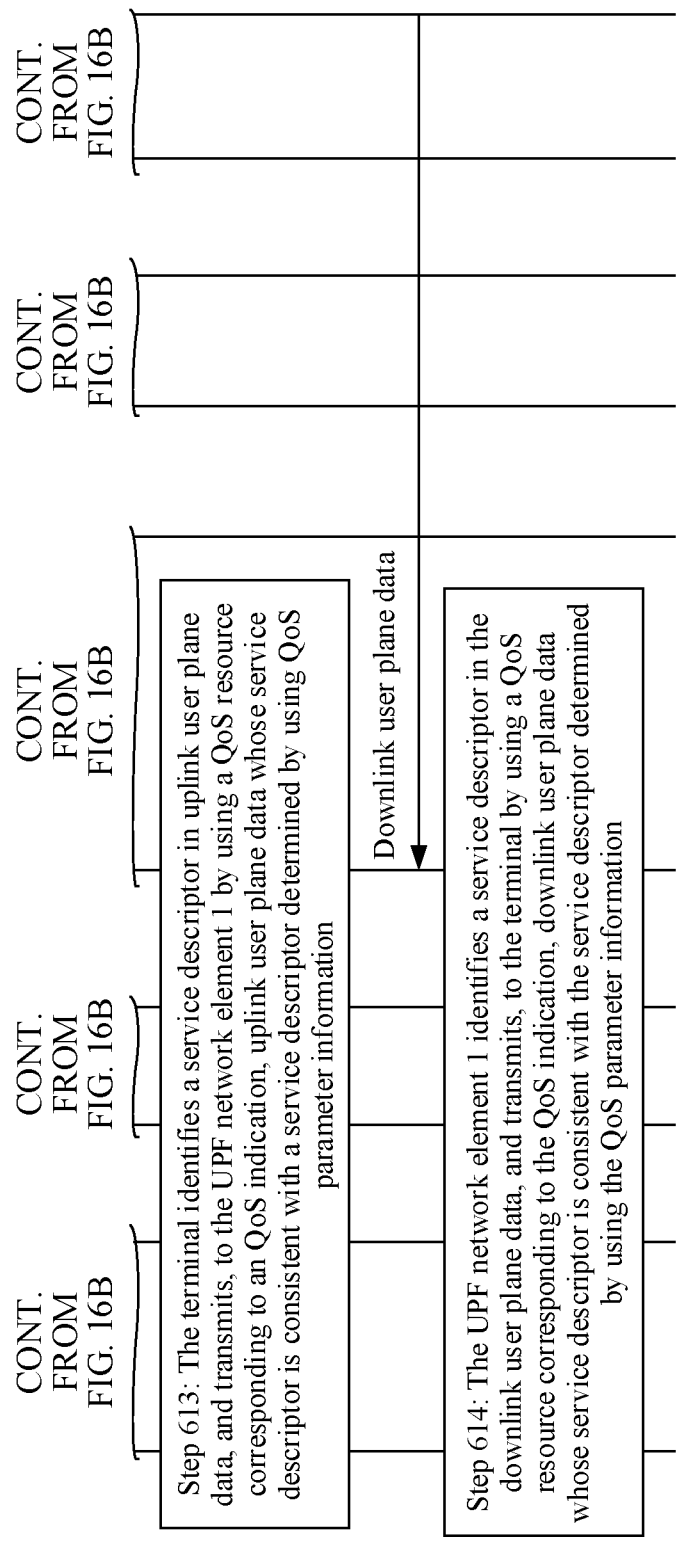

FIG. 16A, FIG. 16B, and FIG. 16C show a specific procedure of yet another session management method according to an embodiment of this application. The method is applicable to the network architecture shown in FIG. 3. The method includes the following steps.

Step 601: A procedure in which a terminal registers with a first network.

Specifically, for the procedure in which the terminal registers with the first network, refer to a description in the prior art. Details are not described herein again.

Step 602: The terminal requests to establish a first session in the first network.

Specifically, a specific process in which the terminal requests to establish the first session in the first network may be as follows: The terminal sends a PDU session establishment request to an AMF network element 1 in the first network, where the PDU session establishment request carries an identifier of the terminal.

Step 603: The AMF network element 1 and a UPF network element 1 complete a remaining establishment procedure for the first session, to establish the first session in the first network.

Step 604: A procedure in which the terminal registers with a second network.

Specifically, for the procedure in which the terminal registers with the second network, refer to the descriptions in step 305 to step 307. Details are not described herein again.

Step 605: The terminal sends an establishment/modification/delete request for a second session to an AMF network element 2.

The PDU session establishment/modification/delete request carries the identifier of the terminal.

Step 606: The terminal completes a remaining establishment, modification, or delete process for the second session.

Step 607 to step 609 are the same as step 310 to step 312 shown in FIG. 11A, FIG. 11B, and FIG. 11C. Step 610 to step 612 are the same as step 313 to step 315. Details are not described herein again.

It should be noted that in step 607 to step 609, the AMF network element 2 identifies, based on the identifier of the terminal, the AMF network element 1 connected to the terminal in the first network. In step 610 to step 612, a PCF network element 2 identifies, based on the identifier of the terminal, a PCF network element 1 connected to the terminal in the first network.

Step 613: The terminal identifies a service descriptor in uplink user plane data, and transmits, to the UPF network element 1 by using a QoS resource determined by using QoS, uplink user plane data whose service descriptor is consistent with a service descriptor determined by using QoS parameter information, where the UPF network element 1 is configured to transmit the received uplink user plane data to a UPF network element 2.

Step 614: The UPF network element 1 identifies a service descriptor in downlink user plane data, and transmits, to the terminal by using a corresponding QoS resource determined by using QoS, downlink user plane data whose service descriptor is consistent with the service descriptor determined by using the QoS parameter information.

The foregoing describes the solutions in the embodiments of this application mainly from a perspective of interaction between network elements. It may be understood that to implement the foregoing functions, the network elements such as the first control plane network element, the second control plane network element, and the first terminal include corresponding hardware structures and/or software modules for executing the functions. A person skilled in the art should be easily aware that, in combination with the examples described in the embodiments disclosed in this specification, units and algorithms steps may be implemented by hardware or a combination of hardware and computer software in this application. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first control plane network element, the second control plane network element, and the first terminal each may be divided into function units based on the foregoing method examples. For example, function units may be obtained through division based on corresponding functions, or two or more functions may be integrated into one processing unit. The integrated unit may be implemented in a form of hardware, or may be implemented in a form of a software functional unit. It should be noted that, in the embodiments of this application, division into the units is an example, and is merely logical function division. During actual implementation, another division manner may be used.

Descriptions are provided below by using an example in which function modules are obtained through division based on corresponding functions.

Figure 17:
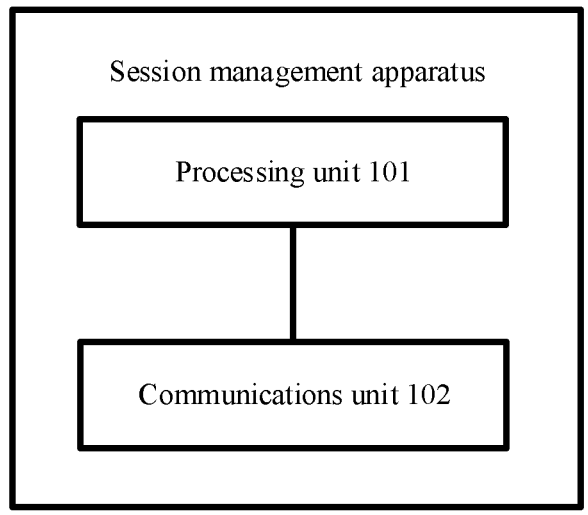
FIG. 17 is a schematic structural diagram of a session management apparatus according to an embodiment of this application.

When an integrated unit is used, FIG. 17 shows a session management apparatus in the foregoing embodiments. The session management apparatus may include a processing unit 101.

In an example, the session management apparatus is a first control plane network element or a chip inside a first control plane network element. The processing unit 101 is configured to support the first control plane network element in performing step 101 and step 102 in the foregoing embodiment.

Optionally, when the session management apparatus is the first control plane network element or the chip inside the first control plane network element, in addition to the processing unit 101, optionally, the session management apparatus may further include a communications unit 102. The communications unit 102 is configured to support the first control plane network element or the chip inside the first control plane network element in performing step 105 in the foregoing embodiment. That is, when the session management apparatus is the first control plane network element or the chip inside the first control plane network element, the communications unit 102 is optional.

Optionally, the communications unit 102 in this embodiment of this application is further configured to support the first control plane network element or the chip inside the first control plane network element in performing step 107 and step 109 in the foregoing embodiment.

In another example, the session management apparatus is a second control plane network element or a chip inside a second control plane network element. The session management apparatus may include the processing unit 101 and a communications unit 102. The processing unit 101 is configured to support the second control plane network element or the chip inside the second control plane network element in performing step 103 in the foregoing embodiment. The communications unit 102 is configured to support the second control plane network element or the chip inside the second control plane network element in performing step 104 in the foregoing embodiment.

Optionally, the communications unit 102 is further configured to support the second control plane network element or the chip inside the second control plane network element in performing step 106 in the foregoing embodiment. The processing unit 101 is further configured to support the second control plane network element or the chip inside the second control plane network element in performing step 108 in the foregoing embodiment.

In still another example, the session management apparatus is a first terminal or a chip inside a first terminal. The processing unit 101 is configured to support the first terminal or the chip inside the first terminal in performing step 201 and step 202 in the foregoing embodiment.

Optionally, when the session management apparatus is the first terminal or the chip inside the first terminal, optionally, the session management apparatus may further include a communications unit 102. The communications unit 102 is configured to support the first terminal or the chip inside the first terminal in performing step 204, step 206, and step 207 in the foregoing embodiment.

In yet another example, the session management apparatus is a second user plane network element or a chip inside a second user plane network element. The session management apparatus includes the processing unit 101 and a communications unit 102. The communications unit 102 is configured to support the second user plane network element or the chip inside the second user plane network element in performing step 210 in the foregoing embodiment. The processing unit 101 is configured to support the second user plane network element or the chip inside the second user plane network element in performing step 211 in the foregoing embodiment.

In still yet another example, the session management apparatus is a first user plane network element or a chip inside a first user plane network element. The session management apparatus includes the processing unit 101 and a communications unit 102. The communications unit 102 is configured to support the first user plane network element or the chip inside the first user plane network element in performing step 110 in the foregoing embodiment. The processing unit 101 is configured to support the first user plane network element or the chip inside the first user plane network element in performing step 111 in the foregoing embodiment. Alternatively, the communications unit 102 is configured to support the first user plane network element or the chip inside the first user plane network element in performing step 208 in the foregoing embodiment. The processing unit 101 is configured to support the first user plane network element or the chip inside the first user plane network element in performing step 209 in the foregoing embodiment.

Figure 18:
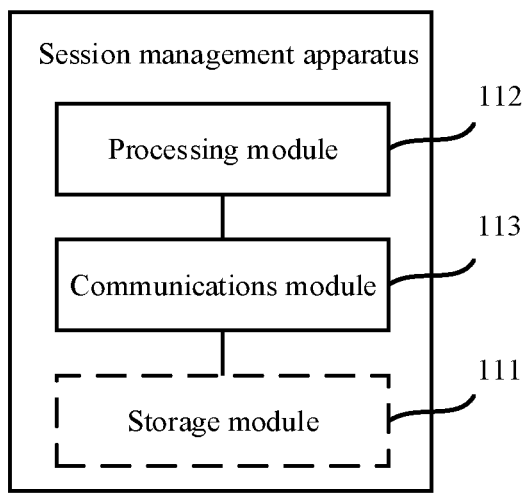
FIG. 18 is a schematic structural diagram of a session management apparatus according to an embodiment of this application.

When an integrated unit is used, FIG. 18 is a possible schematic logical structural diagram of the session management apparatus in the foregoing embodiments. The session management apparatus includes a processing module 112 and a communications module 113. The processing module 112 is configured to control and manage actions of the session management apparatus. For example, the processing module 112 is configured to perform a step of performing information/data processing on the session management apparatus. The communications module 113 is configured to support the session management apparatus in performing an information/data sending or receiving step.

Optionally, the session management apparatus may further include a storage module 111, configured to store program code and data of the session management apparatus.

For example, the session management apparatus is a first control plane network element or a chip applied to a first control plane network element. In this case, the processing module 112 is configured to support the first control plane network element or the chip inside the first control plane network element in performing step 101 and step 102 in the foregoing embodiment.

Optionally, the communications module 113 is configured to support the first control plane network element or the chip applied to the first control plane network element in performing step 105, step 107, or step 109 in the foregoing embodiment.

For example, the session management apparatus is a second control plane network element or a chip applied to a second control plane network element. In this case, the processing module 112 is configured to support the second control plane network element or the chip applied to the second control plane network element in performing step 103 in the foregoing embodiment. The communications module 113 is configured to support the second control plane network element or the chip applied to the second control plane network element in performing step 104 in the foregoing embodiment.

Optionally, the communications module 113 is further configured to support the second control plane network element or the chip applied to the second control plane network element in performing step 106 in the foregoing embodiment. The processing module 112 is further configured to support the second control plane network element or the chip applied to the second control plane network element in performing step 108 in the foregoing embodiment.

For example, the session management apparatus is a first terminal or a chip inside a first terminal. The processing module 112 is configured to support the first terminal or the chip inside the first terminal in performing step 201 and step 202 in the foregoing embodiment.

Optionally, when the session management apparatus is the first terminal or the chip inside the first terminal, optionally, the session management apparatus may further include the communications module 113. The communications module 113 is configured to support the first terminal or the chip inside the first terminal in performing step 204, step 206, and step 207 in the foregoing embodiment.

In another example, the session management apparatus is a second user plane network element or a chip inside a second user plane network element. The session management apparatus includes the processing module 112 and the communications module 113. The communications module 113 is configured to support the second user plane network element or the chip inside the second user plane network element in performing step 210 in the foregoing embodiment. The processing module 112 is configured to support the second user plane network element or the chip inside the second user plane network element in performing step 211 in the foregoing embodiment.

In another example, the session management apparatus is a first user plane network element or a chip inside a first user plane network element. The session management apparatus includes the processing module 112 and the communications module 113. The communications module 113 is configured to support the first user plane network element or the chip inside the first user plane network element in performing step 110 in the foregoing embodiment. The processing module 112 is configured to support the first user plane network element or the chip inside the first user plane network element in performing step 111 in the foregoing embodiment.

Alternatively, the communications module 113 is configured to support the first user plane network element or the chip inside the first user plane network element in performing step 208 in the foregoing embodiment. The processing module 112 is configured to support the first user plane network element or the chip inside the first user plane network element in performing step 209 in the foregoing embodiment.

The processing module 112 may be a processor or a controller. For example, the processing module 112 may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present disclosure. Alternatively, the processor may be a combination of processors implementing a computing function, for example, a combination of one or more microprocessors or a combination of a digital signal processor and a microprocessor. The communications module 113 may be a transceiver, a transceiver circuit, a communications interface, or the like. The storage module 111 may be a memory.

That the session management apparatus shown in FIG. 18 is the first control plane network element is used as an example. When the processing module 112 is a processor 41 or a processor 45, the communications module 113 is a communications interface 43, and the storage module 111 is a memory 42, the session management apparatus in this embodiment of this application may be the communications device shown in FIG. 5.

The memory 42, the processor 41 or the processor 45, and the communications interface 43 are connected to each other by using a communications line 44. For example, the communications device shown in FIG. 5 is the first control plane network element. The processor 41 or the processor 45 is configured to support the communications device in performing step 101 in the foregoing embodiment.

Optionally, the communications interface 43 is configured to support the communications device in performing step 105, step 107, or step 109 in the foregoing embodiment. That the session management apparatus shown in FIG. 18 is the chip inside the first control plane network element is used as an example. The communications module 113 may be a communications interface, for example, an input/output interface, a pin, or a circuit. The processing module 112 may be a processor. The storage module 111 may be a storage unit (for example, a register or a cache) inside the chip. The communications interface is configured to support the chip inside the first control plane network element in performing step 105, step 107, or step 109 in the foregoing embodiment. The processor is configured to support the chip inside the first control plane network element in performing step 101 in the foregoing embodiment.

That the session management apparatus shown in FIG. 18 is the second control plane network element is used as an example. When the processing module 112 is a processor 41 or a processor 45, the communications module 113 is a communications interface 43, and the storage module 111 is a memory 42, the session management apparatus in this embodiment of this application may be the communications device shown in FIG. 5.

The memory 42, the processor 41 or the processor 45, and the communications interface 43 are connected to each other by using a communications line 44. For example, the communications device shown in FIG. 5 is the second control plane network element. The processor 41 or the processor 45 is configured to support the communications device in performing step 103 in the foregoing embodiment. The communications interface 43 is configured to support the communications device in performing step 104 in the foregoing embodiment.

Optionally, the communications interface 43 is configured to support the communications device in performing step 106 in the foregoing embodiment. The processor 41 or the processor 45 is further configured to support the communications device in performing step 108 in the foregoing embodiment. That the session management apparatus shown in FIG. 18 is the chip inside the second control plane network element is used as an example. In this case, the communications module 113 may be a communications interface, for example, an input/output interface, a pin, or a circuit. The processing module 112 may be a processor. The storage module 111 may be a storage unit (for example, a register or a cache) inside the chip. The communications interface is configured to support the chip inside the second control plane network element in performing step 104 and step 106 in the foregoing embodiment. The processor is configured to support the chip inside the second control plane network element in performing step 103 and step 108 in the foregoing embodiment.

That the session management apparatus shown in FIG. 18 is the first terminal is used as an example. When the processing module 112 is a processor 41 or a processor 45, the communications module 113 is a communications interface 43, and the storage module 111 is a memory 42, the session management apparatus in this embodiment of this application may be the communications device shown in FIG. 5.

The memory 42, the processor 41 or the processor 45, and the communications interface 43 are connected to each other by using a communications line 44. For example, the communications device shown in FIG. 5 is the first terminal. The processor 41 or the processor 45 is configured to support the communications device in performing step 201 and step 202 in the foregoing embodiment.

Optionally, the communications interface 43 is configured to support the communications device in performing step 204, step 206, and step 207 in the foregoing embodiment.

That the session management apparatus shown in FIG. 18 is the chip inside the first terminal is used as an example. The communications module 113 may be a communications interface, for example, an input/output interface, a pin, or a circuit. The processing module 112 may be a processor. The storage module 111 may be a storage unit (for example, a register or a cache) inside the chip. The communications interface is configured to support the chip inside the first terminal in performing step 204, step 206, and step 207 in the foregoing embodiment. The processor is configured to support the chip inside the first terminal in performing step 201 and step 202 in the foregoing embodiment.

That the session management apparatus shown in FIG. 18 is the second user plane network element is used as an example. When the processing module 112 is a processor 41 or a processor 45, the communications module 113 is a communications interface 43, and the storage module 111 is a memory 42, the session management apparatus in this embodiment of this application may be the communications device shown in FIG. 5.

The memory 42, the processor 41 or the processor 45, and the communications interface 43 are connected to each other by using a communications line 44. For example, the communications device shown in FIG. 5 is the second user plane network element. The processor 41 or the processor 45 is configured to support the communications device in performing step 211 in the foregoing embodiment. The communications interface 43 is configured to support the communications device in performing step 210 in the foregoing embodiment.

That the session management apparatus shown in FIG. 18 is the chip inside the first user plane network element is used as an example. In this case, the communications module 113 may be a communications interface, for example, an input/output interface, a pin, or a circuit. The processing module 112 may be a processor. The storage module 111 may be a storage unit (for example, a register or a cache) inside the chip. The communications interface is configured to support the chip inside the first user plane network element in performing step 110 in the foregoing embodiment. The processor is configured to support the chip inside the first user plane network element in performing step 111 in the foregoing embodiment. Alternatively, the communications interface is configured to support the chip inside the first user plane network element in performing step 208 in the foregoing embodiment. The processor is configured to support the chip inside the first user plane network element in performing step 209 in the foregoing embodiment.

Figure 19:
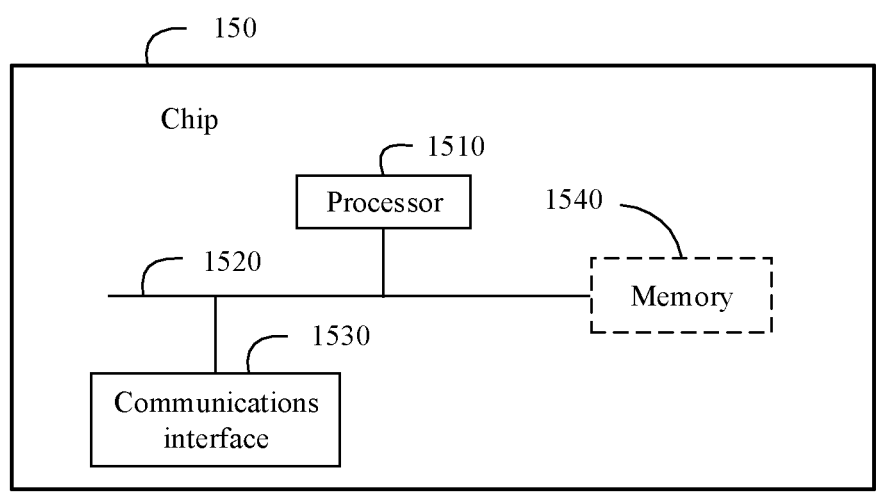
FIG. 19 is a schematic structural diagram of a chip according to an embodiment of this application.

FIG. 19 is a schematic structural diagram of a chip 150 according to an embodiment of this application. The chip 150 includes one or more processors 1510 and one or more communications interfaces 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following element: an executable module or a data structure, a subset thereof, or an extended set thereof.

In this embodiment of this application, the operation instruction stored in the memory 1540 (where the operation instruction may be stored in an operating system) is invoked to perform a corresponding operation.

In a possible implementation, structures of chips used by a first terminal, a first control plane network element, a second control plane network element, a first user plane network element, and a second user plane network element are similar, and different apparatuses may use different chips to implement respective functions.

The processor 1510 controls a processing operation of any one of the first terminal, the first control plane network element, the second control plane network element, the first user plane network element, and the second user plane network element. The processor 1510 may also be referred to as a central processing unit (CPU).

The memory 1540 may include the read-only memory and the random access memory, and provide the instruction and the data to the processor 1510. The part of the memory 1540 may further include the non-volatile random access memory (NVRAM). For example, during application, the memory 1540, the communications interface 1530, and the memory 1540 are coupled together by using a bus system 1520. In addition to a data bus, the bus system 1520 may further include a power bus, a control bus, a status signal bus, or the like. However, for clear description, various types of buses in FIG. 19 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, steps in the foregoing methods may be implemented by using a hardware integrated logic circuit in the processor 1510 or by using instructions in a form of software. The processor 1510 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1510 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in the memory 1540. The processor 1510 reads information in the memory 1540 and completes the steps in the foregoing methods in combination with hardware of the processor 1510.

In a possible implementation, the communications interface 1530 is configured to perform sending and receiving steps of the first terminal, the first control plane network element, the second control plane network element, the first user plane network element, and the second user plane network element in the embodiments shown in FIG. 6 to FIG. 10. The processor 1510 is configured to perform processing steps of the first terminal, the first control plane network element, the second control plane network element, the first user plane network element, and the second user plane network element in the embodiments shown in FIG. 6 to FIG. 10.

The communications unit may be an interface circuit or a communications interface of the apparatus, and is configured to receive a signal from another apparatus. For example, when the apparatus is implemented by using a chip, the communications unit is an interface circuit or a communications interface used by the chip to receive a signal from or send a signal to another chip or apparatus.

In the foregoing embodiments, the instruction that is stored in the memory and that is to be executed by the processor may be implemented in a form of a computer program product. The computer program product may be written to the memory in advance, or may be downloaded and installed in the memory in a form of software.

The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored in the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk, SSD), or the like.

According to an aspect, a computer-readable storage medium is provided. The computer-readable storage medium stores an instruction. When the instruction is run, a first control plane network element or a chip applied to a first control plane network element is enabled to perform step 101, step 102, step 105, step 107, and step 109 in the embodiment.

According to an aspect, a computer-readable storage medium is provided. The computer-readable storage medium stores an instruction. When the instruction is run, a second control plane network element or a chip applied to a second control plane network element is enabled to perform step 103, step 104, step 106, and step 108 in the embodiment.

According to an aspect, a computer-readable storage medium is provided. The computer-readable storage medium stores an instruction. When the instruction is run, a first terminal or a chip applied to a first terminal is enabled to perform step 201, step 202, step 204, step 206, and step 207 in the embodiment.

According to an aspect, a computer-readable storage medium is provided. The computer-readable storage medium stores an instruction. When the instruction is run, a first user plane network element or a chip applied to a first user plane network element is enabled to perform step 110 and step 111 in the embodiment, or a first user plane network element or a chip applied to a first user plane network element is enabled to perform step 208 and step 209 in the embodiment.

According to an aspect, a computer-readable storage medium is provided. The computer-readable storage medium stores an instruction. When the instruction is run, a second user plane network element or a chip applied to a second user plane network element is enabled to perform step 210 and step 211 in the embodiment.

The foregoing readable storage medium may include: any medium that can store program code, such as a USB flash drive, a removable hard disk, a read-only memory, a random access memory, a magnetic disk, or an optical disc.

According to an aspect, a computer program product including an instruction is provided. The computer program product stores the instruction. When the instruction is run, a first control plane network element or a chip applied to a first control plane network element is enabled to perform step 101, step 102, step 105, step 107, and step 109 in the embodiment.

According to another aspect, a computer program product including an instruction is provided. The computer program product stores the instruction. When the instruction is run, a second control plane network element or a chip applied to a second control plane network element is enabled to perform step 103, step 104, step 106, and step 108 in the embodiment.

According to an aspect, a computer program product including an instruction is provided. The computer program product stores the instruction. When the instruction is run, a first terminal or a chip applied to a first terminal is enabled to perform step 201, step 202, step 204, step 206, and step 207 in the embodiment.

According to another aspect, a computer program product including an instruction is provided. The computer program product stores the instruction. When the instruction is run, a first user plane network element or a chip applied to a first user plane network element is enabled to perform step 110 and step 111 in the embodiment, or a first user plane network element or a chip applied to a first user plane network element is enabled to perform step 208 and step 209 in the embodiment.

According to an aspect, a computer program product including an instruction is provided. The computer program product stores the instruction. When the instruction is run, a second user plane network element or a chip applied to a second user plane network element is enabled to perform step 210 and step 211 in the embodiment.

According to an aspect, a chip is provided. The chip is applied to a first control plane network element. The chip includes at least one processor and a communications interface. The communications interface is coupled to the at least one processor. The processor is configured to run an instruction, to perform step 101, step 102, step 105, step 107, and step 109 in the embodiment.

According to another aspect, a chip is provided. The chip is applied to a second control plane network element. The chip includes at least one processor and a communications interface. The communications interface is coupled to the at least one processor. The processor is configured to run an instruction, to perform step 103, step 104, step 106, and step 108 in the embodiment.

According to another aspect, a chip is provided. The chip is applied to a first terminal. The chip includes at least one processor and a communications interface. The communications interface is coupled to the at least one processor. The processor is configured to run an instruction, to perform step 201, step 202, step 204, step 206, and step 207 in the embodiment.

According to still another aspect, a chip is provided. The chip is applied to a first user plane network element. The chip includes at least one processor and a communications interface. The communications interface is coupled to the at least one processor. The processor is configured to run an instruction to perform step 110 and step 111 in the embodiment, or perform step 208 and step 209 in the embodiment.

According to still another aspect, a chip is provided. The chip is applied to a second user plane network element. The chip includes at least one processor and a communications interface. The communications interface is coupled to the at least one processor. The processor is configured to run an instruction, to perform step 210 and step 211 in the embodiment.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, obviously, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. In this way, this application is intended to cover these modifications and variations of this application provided that they fall within the scope of protection defined by the following claims of this application and their equivalent technologies.

What is claimed is:

1. A session management method, comprising:
   determining, by a first control plane network element in a first network, to manage a session in the first network for a connection for a terminal for connecting to a second network, wherein the first control plane network element is a network element in the first network; and
   managing the session by the first control plane network element; wherein the determining by the first control plane network element in the first network, comprises:
     determining, by the first control plane network element, that a second QoS parameter of user plane data of the terminal in the second network is inconsistent with a first QoS parameter of user plane data of the terminal in the first network, the second network being a network accessed by the terminal through the first network; and
   wherein managing the session, by the first control plane network element, comprises:
     managing, by the first control plane network element, the session based on the second QoS parameter.

2. The method according to claim 1, further comprising:
   receiving, by the first control plane network element, a session management trigger message from a second control plane network element in the second network, wherein the session management trigger message includes an instruction for the first control plane network element to manage the session; and
   the determining, by a first control plane network element in a first network, to manage a session comprises determining, by the first control plane network element based on the session management trigger message, to manage the session in the first network.

3. The method according to claim 2, wherein the session management trigger message comprises QoS parameter information, the method further comprising determining, based on the QoS parameter information, a QoS requirement for transmitting user plane data of the terminal in the first network; and
   the managing, by the first control plane network element, the session comprises managing, by the first control plane network element, the session based on the QoS parameter information.

4. The method according to claim 1, further comprising:
   receiving, by the first control plane network element, information about the terminal from a second control plane network element in the second network; and
   the determining to manage the session by the first control plane network element is based on the information about the terminal.

5. The method according to claim 4, wherein the information about the terminal comprises any one or more of the following: an identifier of the terminal, an identifier of the session, and an IP address.

6. The method according to claim 3, wherein the QoS parameter information comprises any one or more of the following: a service descriptor and a QoS indication, wherein:
   the service descriptor provides for determining the user plane data of the terminal in the first network; and
   the QoS indication indicates a requirement on a QoS resource used by the user plane data of the terminal in the first network and that corresponds to the service descriptor.

7. The method according to claim 1, further comprising:
   determining, by the first control plane network element, target QoS parameter information of the user plane data of the terminal in the first network, wherein the target QoS parameter information is the second QoS parameter; and
   sending, by the first control plane network element, the target QoS parameter information to a first user plane network element in the first network.

8. The method according to claim 1, wherein the managing the session by the first control plane network element comprises modifying the session by the first control plane network element.

9. An apparatus, comprising:
   a processor; and
   a memory coupled to the processor and storing instructions for execution by the processor, wherein the instructions, when executed by the processor, cause the apparatus in a first network to:
     determine to manage a session in the first network for a connection for a terminal to connect to a second network; and
     manage the session, wherein:
       determining a session to manage comprises determining a second QoS parameter of user plane data of the terminal in the second network is inconsistent with a first QoS parameter in the first network, the second network being a network accessed by the terminal through the first network; and
       management of the session is based on the second QoS parameter.

10. The apparatus according to claim 9, wherein the instructions, when executed by the processor, further cause the apparatus to:
    receive a session management trigger message from a second control plane network element in the second network, wherein the session management trigger message requests the apparatus to manage the session; and
    determine, based on the session management trigger message, to manage the session in the first network.

11. The apparatus according to claim 10, wherein the session management trigger message comprises QoS parameter information for determining a QoS requirement for transmitting user plane data of the terminal in the first network; and
    the instructions, when executed by the processor, further cause the apparatus to manage the session based on the QoS parameter information.

12. The apparatus according to claim 9, wherein the instructions, when executed by the processor, further cause the apparatus to:

receive information about the terminal from a second control plane network element in the second network, wherein the information about the terminal is for determining the session; and the instructions, when executed by the processor, further cause the apparatus to determine, based on the information about the terminal, to manage the session.

13. The apparatus according to claim 12, wherein the information about the terminal comprises any one or more of the following: an identifier of the terminal, an identifier of the session, and an IP address.

14. The apparatus according to claim 11, wherein the QoS parameter information comprises any one or more of the following: a service descriptor and a QoS indication, wherein:

the service descriptor is for determining the user plane data of the terminal in the first network, and the QoS indication indicates a requirement on a QoS resource used by the user plane data of the terminal in the first network and that corresponds to the service descriptor.

15. The apparatus according to claim 9, wherein the instructions, when executed by the processor, further cause the apparatus to:

determine target QoS parameter information of the user plane data of the terminal in the first network, wherein the target QoS parameter information is the second QoS parameter; and send the target QoS parameter information to a first user plane network element in the first network.

16. The apparatus according to claim 9, wherein the instructions, when executed by the processor, further cause the apparatus to modify the session.

* * * * *